United States Patent
Nonaka et al.

(10) Patent No.: US 10,836,861 B2
(45) Date of Patent: Nov. 17, 2020

(54) METHODS OF PREPARING AND PURIFYING POLYALKYLENE GLYCOL DERIVATIVE

(71) Applicant: Shin-Etsu Chemical Co., Ltd., Tokyo (JP)

(72) Inventors: Shiori Nonaka, Joetsu (JP); Yuki Suka, Joetsu (JP); Yuji Harada, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 142 days.

(21) Appl. No.: 16/042,631

(22) Filed: Jul. 23, 2018

(65) Prior Publication Data

US 2019/0023841 A1    Jan. 24, 2019

(30) Foreign Application Priority Data

Jul. 24, 2017   (JP) ................................ 2017-142468

(51) Int. Cl.

| | |
|---|---|
| C08G 65/12 | (2006.01) |
| C08G 65/26 | (2006.01) |
| C08G 65/333 | (2006.01) |
| B01J 41/20 | (2006.01) |
| B01J 39/05 | (2017.01) |
| B01J 39/26 | (2006.01) |
| B01J 41/05 | (2017.01) |
| C08G 65/30 | (2006.01) |
| C08G 65/334 | (2006.01) |
| C08G 65/336 | (2006.01) |

(52) U.S. Cl.
CPC .............. *C08G 65/12* (2013.01); *B01J 39/05* (2017.01); *B01J 39/26* (2013.01); *B01J 41/05* (2017.01); *B01J 41/20* (2013.01); *C08G 65/2609* (2013.01); *C08G 65/2618* (2013.01); *C08G 65/2639* (2013.01); *C08G 65/30* (2013.01); *C08G 65/336* (2013.01); *C08G 65/3346* (2013.01); *C08G 65/33306* (2013.01)

(58) Field of Classification Search
CPC .... C08G 65/30; C08G 65/325; C08G 65/333; B01J 39/00; B01J 39/04; B01J 39/18; B01J 39/19; B01J 41/00; B01J 41/04; B01J 41/12; B01J 41/13
See application file for complete search history.

(56) References Cited

U.S. PATENT DOCUMENTS

| | | | |
|---|---|---|---|
| 4,650,909 A * | 3/1987 | Yoakum .................. | C08G 65/30 568/621 |
| 4,987,271 A | 1/1991 | Watabe et al. | |
| 5,449,513 A | 9/1995 | Yokoyama et al. | |
| 6,455,639 B1 | 9/2002 | Yasukohchi et al. | |
| 2001/0000510 A1 | 4/2001 | Sakurai et al. | |
| 2016/0159831 A1 * | 6/2016 | Suka ................ | C08G 65/33306 556/423 |

FOREIGN PATENT DOCUMENTS

| | | |
|---|---|---|
| CN | 201648275 * | 11/2010 |
| EP | 1 792 927 A1 | 6/2007 |
| EP | 3 064 524 A1 | 9/2016 |
| JP | 2-289618 A | 11/1990 |
| JP | 2690276 B2 | 12/1997 |
| JP | 2777530 B2 | 7/1998 |
| JP | 11-335267 A | 12/1999 |
| JP | 3050228 B2 | 6/2000 |
| JP | 2004-181352 A | 7/2004 |
| JP | 3562000 B2 | 9/2004 |
| JP | 2016-108529 A | 6/2016 |
| WO | WO 2014/157584 A1 | 10/2014 |

OTHER PUBLICATIONS

Translation of CN 201648275 (2010) (Year: 2010).*
Akai et al., "Synthesis of Long-Chain [$^{18}$F]Deoxyfluoropoly(ethylene glycol) Methyl Ethers and Their Noninvasive Pharmacokinetic Analysis by Positron Emission Tomography," Molecular Pharmaceutics (Feb. 7, 2011), vol. 8, No. 1, pp. 302-308.
Extended European Search Report dated Oct. 26, 2018, in European Patent Application No. 18185061.1.
Japanese Office Action for Japanese Application No. 2017-142468, dated July 28, 2020 (w/ English language translation)

* cited by examiner

*Primary Examiner* — Robert C Boyle
(74) *Attorney, Agent, or Firm* — Birch, Stewart, Kolasch & Birch, LLP

(57) ABSTRACT

A polyalkylene glycol derivative with a minimal impurity content is prepared simply by the steps of reacting a compound having formula (III-I) or (III-II) with an electrophile having formula (IV) in the presence of an optional basic compound, to form a reaction solution containing a compound having formula (V), and passing the reaction solution through a column of cation and anion exchange resins to remove water-soluble impurities, for thereby purifying the desired polyalkylene glycol derivative.

$$R^1-R^2-O-(R^3-O)_{n-1}R^3-O^-M^+ \quad \text{(III-I)}$$

$$R^1-R^2-O-(R^3-O)_{n-1}R^3-OH \quad \text{(III-II)}$$

$$R^4-R^5-X \quad \text{(IV)}$$

$$R^1-R^2-O-(R^3-O)_n-R^5-R^4 \quad \text{(V)}$$

17 Claims, No Drawings

METHODS OF PREPARING AND PURIFYING POLYALKYLENE GLYCOL DERIVATIVE

CROSS-REFERENCE TO RELATED APPLICATION

This non-provisional application claims priority under 35 U.S.C. § 119(a) on Patent Application No. 2017-142468 filed in Japan on Jul. 24, 2017, the entire contents of which are hereby incorporated by reference.

TECHNICAL FIELD

This invention relates to methods for preparing and purifying polyalkylene glycol derivatives.

BACKGROUND ART

In the field of drug delivery system (DDS), it is recently proposed in Patent Documents 1 to 3 to encapsulate drugs in polymeric micelles using block copolymers consisting of hydrophilic segments and hydrophobic segments. With this method, polymeric micelles function as a drug carrier, achieving various effects including sustained release of drug in the body and concentrated administration of drug to lesion sites.

The hydrophilic segments exemplified in Patent Documents 1 to 3 include polyalkylene glycol skeletons. Compounds of polyalkylene glycol skeletons are less toxic in the body and enable to delay excretion from the kidney. As a result, the residence time within blood can be prolonged as compared with polyalkylene glycol skeleton-free compounds. The encapsulation of a drug in micelles using polyalkylene glycol derivatives is thus effective for reducing the dose and administration frequency of the drug.

Of the polyalkylene glycol derivatives, a derivative terminated with an amino group can be converted to a block copolymer composed of a polyalkylene glycol skeleton and an amino acid skeleton via ring-opening polymerization reaction with an α-amino acid-N-carboxy anhydride. The encapsulation of drug in polymeric mecelles using the block copolymer thus obtained is exemplified in Patent Documents 1 to 3.

For the synthesis of a polyalkylene glycol derivative terminated with an amino group, many examples are known. For example, Patent Documents 4 and 5 describe a method involving polymerization of alkylene oxide using a metal salt of a monohydric alcohol as polymerization initiator, and converting the polymer end to a hydroxyl group and then to a 2-cyanoethoxy group, and via hydrogen reduction of the cyano group, eventually to an amino-containing substituent (e.g., 3-amino-1-propoxy group).

Also, Patent Document 6 describes that the polymerization of alkylene oxide using a metal salt of a monohydric alcohol as polymerization initiator is followed by introduction of an acid labile group-protected amino group, and subsequent deprotection under acidic conditions, for thereby synthesizing a polyalkylene glycol derivative terminated with a free amino group.

CITATION LIST

Patent Document 1: JP 2690276
Patent Document 2: JP 2777530
Patent Document 3: JP-A H11-335267
Patent Document 4: JP 3050228
Patent Document 5: JP 3562000
Patent Document 6: JP-A 2016-108529 (US 20160159831, EP 3064524)

SUMMARY OF INVENTION

Since polyalkylene glycol derivatives are highly hydrophilic, they are unamenable to water washing like separatory operation for purification. If the reaction product contains water-soluble impurities such as a basic compound used as a reaction reagent in the preparation process and a by-product salt formed by reaction, it is necessary to remove such impurities.

In Patent Documents 4 and 5, conversion reaction to 2-cyanoethoxy group is carried out in the presence of an inorganic base and the base is removed using an alkali adsorbent. Although the base removal using an alkali adsorbent is easy, the polymer itself can be adsorbed depending on the structure of a terminal functional group, leading to a lowering of yield. The method of Patent Documents 4 and 5 further involves purification of the final product, amino-containing polymer with a cation exchange resin, inevitably inviting an increase in the number of steps.

In Patent Document 6, the reaction product of polyalkylene oxide with an electrophile is subjected in the crude state to deprotection of the acid labile group using hydrochloric acid, and then purified using a cation exchange resin. However, the purifying step requires that the polymer is adsorbed to the cation exchange resin, impurities are washed away, and thereafter, the polymer is eluted. The method inevitably invites an increase in the number of steps. Under certain polymer elution conditions, the once adsorbed metals or impurities can be eluted again.

An object of the invention is to provide a method for preparing a polyalkylene glycol derivative having a minimal impurity content in a simple manner.

The inventors have found that from a mixture containing a polyalkylene glycol derivative and water-soluble impurities, only the water-soluble impurities are adsorbed to ion exchange resins, after which the polyalkylene glycol derivative can be readily isolated. When a polyalkylene glycol derivative having an acid labile group as the protecting group is used, deprotection reaction can take place at the same time as the purification.

Accordingly, in one aspect, the invention provides a method for preparing a polyalkylene glycol derivative, comprising the steps (3) and (4):

step (3) of reacting a compound having the formula (III-I) with an electrophile having the formula (IV) optionally in the presence of a basic compound, to synthesize a polyalkylene glycol derivative having the formula (V), and step (4) of removing water-soluble impurities with the aid of a cation exchange resin and an anion exchange resin, for thereby purifying the desired polyalkylene glycol derivative.

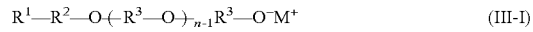

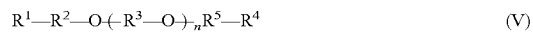

Herein $R^1$ and $R^4$ are each independently hydrogen, a $C_1$-$C_{20}$ monovalent hydrocarbon group, an azido group, a cyano group, an amino group having a protective group of the formula (IV-I), a hydroxyl group having a protective group of the formula (IV-II), or an acetal group of the formula (IV-III), $R^2$ is a $C_1$-$C_6$ divalent hydrocarbon group, oxyalkylene group or polyoxyalkylene group, $R^3$ is a $C_2$-$C_8$ divalent hydrocarbon group, n is an integer of 1 to 450, $R^5$ is a $C_1$-$C_6$ divalent hydrocarbon group, M is an alkali metal, X is a leaving group,

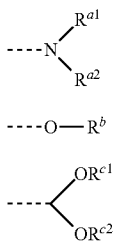 (IV-I)

(IV-II)

(IV-III)

wherein $R^{a1}$ and $R^{a2}$ are each independently hydrogen or an amino protecting group, at least one of $R^{a1}$ and $R^{a2}$ being an amino protecting group, $R^{a1}$ and $R^{a2}$ may bond together to form a ring with the nitrogen atom to which they are attached, $R^b$ is a hydroxyl protecting group, $R^{c1}$ and $R^{c2}$ are each independently a $C_1$-$C_6$ monovalent hydrocarbon group which may contain an oxygen atom, $R^{c1}$ and $R^{c2}$ may bond together to form a cyclic acetal group, and the broken line designates a valence bond.

In a second aspect, the invention provides a method for preparing a polyalkylene glycol derivative, comprising the steps (3') and (4):

step (3') of reacting a compound having the formula (III-II) with an electrophile having the formula (IV) in the presence of a basic compound, to synthesize a polyalkylene glycol derivative having the formula (V), and step (4) of removing water-soluble impurities with the aid of a cation exchange resin and an anion exchange resin, for thereby purifying the desired polyalkylene glycol derivative.

 (III-II)

 (IV)

 (V)

Herein $R^1$ to $R^5$, X and n are as defined above.

In a third aspect, the invention provides a method for preparing a polyalkylene glycol derivative, comprising the steps (1), (2-1), (3) and (4):

step (1) of reacting a compound having the formula (I) with an alkali metal or alkali metal compound selected from M, $M^+H^-$, $R_X^-M^+$, $[R_Y]^{i-}M^+$ and $R_ZO^-M^+$ wherein M is an alkali metal, $R_X$ is a $C_1$-$C_{20}$ alkyl group or $C_7$-$C_{20}$ aralkyl group, $R_Y$ is an optionally substituted aromatic compound, $R_Z$ is a $C_1$-$C_6$ alkyl group, to synthesize a compound having the formula (II), step (2-1) of reacting the compound having the formula (II) with an alkylene oxide in a polymerization solvent to synthesize a compound having the formula (III-I), step (3) of reacting the compound having the formula (III-I) with an electrophile having the formula (IV) optionally in the presence of a basic compound, to synthesize a polyalkylene glycol derivative having the formula (V), and step (4) of removing water-soluble impurities with the aid of a cation exchange resin and an anion exchange resin, for thereby purifying the desired polyalkylene glycol derivative.

 (I)

 (II)

 (III-I)

 (IV)

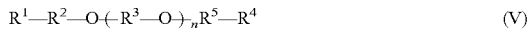 (V)

Herein $R^1$ to $R^5$, M, X and n are as defined above.

In a fourth aspect, the invention provides a method for preparing a polyalkylene glycol derivative, comprising the steps (1), (2-1), (2-2), (3') and (4):

step (1) of reacting a compound having the formula (I) with an alkali metal or alkali metal compound selected from M, $M^+H^-$, $R_X^-M^+$, $[R_Y]^{i-}M^+$ and $R_ZO^-M^+$ wherein M is an alkali metal, $R_X$ is a $C_1$-$C_{20}$ alkyl group or $C_7$-$C_{20}$ aralkyl group, $R_Y$ is an optionally substituted aromatic compound, $R_Z$ is a $C_1$-$C_6$ alkyl group, to synthesize a compound having the formula (II), step (2-1) of reacting the compound having the formula (II) with an alkylene oxide in a polymerization solvent to synthesize a compound having the formula (III-I), step (2-2) of reacting the compound having the formula (III-I) with an acidic compound to form a compound having the formula (III-II), step (3') of reacting the compound having the formula (III-II) with an electrophile having the formula (IV) in the presence of a basic compound, to synthesize a polyalkylene glycol derivative having the formula (V), and step (4) of removing water-soluble impurities with the aid of a cation exchange resin and an anion exchange resin, for thereby purifying the desired polyalkylene glycol derivative.

 (I)

 (II)

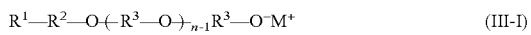 (III-I)

 (III-II)

 (IV)

 (V)

Herein $R^1$ to $R^5$, M, X and n are as defined above.

In a preferred embodiment, $R^1$ and/or $R^4$ is an amino group having a protective group of the formula (IV-I), a hydroxy group having a protective group of the formula (IV-II), or an acetal group of the formula (IV-III), the protecting group being deprotected under acidic conditions.

More preferably, $R^1$ and/or $R^4$ is a group having the formula (IV-I). More preferably the group having the formula (IV-I) is a group having the formula (IV-I-I):

 (IV-I-I)

wherein $R^{d1}$ and $R^{d2}$ are each independently a $C_1$-$C_6$ straight, branched or cyclic monovalent hydrocarbon group, and $R^{d1}$ and $R^{d2}$ may bond together to form a ring with the silicon atoms to which they are attached and the nitrogen atom therebetween.

The method may further comprise, between steps (3) or (3') and (4), the step of reacting the polyalkylene glycol derivative having a protective group with an acid in water or an alcohol solvent for deprotection.

In step (4), the cation exchange resin and the anion exchange resin are preferably used to deprotect the polyalkylene glycol derivative having formula (V) and simultaneously remove water-soluble impurities, for thereby purifying the desired polyalkylene glycol derivative.

In a preferred embodiment, the cation exchange resin is a styrenic H type strong acid cation exchange resin, and the anion exchange resin is a styrenic OH type strong base anion exchange resin. More preferably, the cation exchange resin is a styrenic H type strong acid cation exchange resin of gellular type or porous type having a degree of crosslinking of at least 10.

In a further aspect, the invention provides a method for purifying a mixture containing a polyalkylene glycol derivative and water-soluble impurities, comprising the step of letting a cation exchange resin and an anion exchange resin adsorb the water-soluble impurities for thereby removing the water-soluble impurities and purifying the polyalkylene glycol derivative.

Typically, the polyalkylene glycol derivative is a polyalkylene glycol derivative terminated with an amino group.

Advantageous Effects of Invention

The method for preparing a polyalkylene glycol derivative according to the invention is useful in the preparation of polyalkylene glycol derivatives having a variety of terminal modifying groups because purification after O-alkylation reaction of polyalkylene glycol or polyalkylene glucoside is easy. When the terminal modifying group contains an acid labile group as the protecting group, the deprotection of the acid labile group can be conducted with the ion exchange resin. The inventive method is simpler than the conventional method involving end-stopping reaction, purification, deprotection, and purification.

The polyalkylene glycol derivative obtained from the inventive method is useful as a polyalkylene glycol modifying agent in the DDS field or an initiator in block copolymer synthesis.

DESCRIPTION OF PREFERRED EMBODIMENTS

The notation (Cn-Cm) means a group containing from n to m carbon atoms per group.

In chemical formulae, the broken line designates a valence bond.

One embodiment of the invention is a method for preparing a polyalkylene glycol derivative, comprising the steps (3) or (3') and (4):

step (3) of reacting a compound having the formula (III-I) with an electrophile having the formula (IV) optionally in the presence of a basic compound, to synthesize a polyalkylene glycol derivative having the formula (V), or step (3') of reacting a compound having the formula (III-II) with an electrophile having the formula (IV) in the presence of a basic compound, to synthesize a polyalkylene glycol derivative having the formula (V), and step (4) of removing water-soluble impurities with the aid of a cation exchange resin and an anion exchange resin, for thereby purifying the desired polyalkylene glycol derivative. Notably, the detail of each step will be described later.

(III-I)

(III-II)

(IV)

(V)

Herein $R^1$ and $R^4$ are each independently hydrogen, a $C_1$-$C_{20}$ monovalent hydrocarbon group, an azido group, a cyano group, an amino group having a protective group, a hydroxyl group having a protective group, or an acetal group.

Suitable monovalent hydrocarbon groups include straight, branched or cyclic alkyl groups such as methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, isopropyl, isobutyl, sec-butyl, tert-butyl, isopentyl, neopentyl, 1-ethylpropyl, isohexyl, 1,1-dimethylbutyl, 2,2-dimethylbutyl, 3,3-dimethylbutyl, 2-ethylbutyl, cyclopropyl, cyclobutyl, cyclopentyl, cyclohexyl, cycloheptyl, cyclooctyl, cyclononyl, cyclodecyl, cycloundecyl, cyclododecyl, cyclotridecyl, and cycloeicosyl; aryl groups such as phenyl, o-tolyl, m-tolyl, p-tolyl, 2,3-xylyl, 2,4-xylyl, 2,5-xylyl, 2,6-xylyl, 3,4-xylyl, 3,5-xylyl, and mesityl; and straight, branched or cyclic alkenyl groups such as vinyl and allyl.

The amino group having a protective group, the hydroxyl group having a protective group, and the acetal group have the following formulae (IV-I), (IV-II), and (IV-III), respectively.

In formula (IV-I), $R^{a1}$ and $R^{a2}$ are each independently hydrogen or an amino protecting group, at least one of $R^{a1}$ and $R^{a2}$ being an amino protecting group. Also, $R^{a1}$ and $R^{a2}$ may bond together to form a ring with the nitrogen atom to which they are attached.

Examples of the amino protecting group include, but are not limited to, a silyl type protecting group of the formula: —Si($R^d$)$_3$, a carbonate type protecting group of the formula: —OCOR$^e$, a cyclic protecting group, benzyl, p-methoxybenzyl, p-toluenesulfonyl, 2-nitrobenzenesulfonyl, (2-trimethylsilyl)ethanesulfonyl, allyl, pivaloyl, methoxymethyl, di(4-methoxyphenyl)methyl, 5-dibenzosuberyl, trinylmethyl, (4-methoxyphenyl)diphenylmethyl, 9-phenylfluorenyl, [2-(trimethylsilyl)ethoxy]methyl, and N-3-acetoxypropyl.

In the formula: —Si($R^d$)$_3$, $R^d$ is a $C_1$-$C_6$ straight, branched or cyclic monovalent hydrocarbon group. Examples of $R^d$ include, but are not limited to, methyl, ethyl, n-propyl, isopropyl, n-butyl, isobutyl, tert-butyl, n-pentyl, n-hexyl, cyclopropyl, cyclobutyl, cyclopentyl and cyclohexyl.

In the formula: —OCOR$^e$, $R^e$ is a $C_1$-$C_{20}$ monovalent hydrocarbon group which may contain a halogen, oxygen, nitrogen, sulfur, silicon, phosphorus or boron atom. Examples of the carbonate type protecting group of the formula: —OCOR$^e$ include methyloxycarbonyl, ethyloxycarbonyl, isobutyloxycarbonyl, tert-butyloxycarbonyl, tert-pentyloxycarbonyl, 2,2,2-trichloroethyloxycarbonyl, 2-trimethylsilylethyloxycarbonyl, phenylethyloxycarbonyl, 1-(1-adamantyl)-1-methylethyloxycarbonyl, 1,1-dimethyl- 2-haloethyloxycarbonyl, 1,1-dimethyl-2,2-dibromoethyloxycarbonyl, 1,1-dimethyl-2,2,2-trichloroethyloxycarbonyl, 1-methyl-1-(4-biphenylyl)ethyloxycarbonyl, 1-(3,5-di-tert-butylphenyl)-1-methylethyloxycarbonyl, 2-(2'-pyridyl)ethyloxycarbonyl, 2-(4'-pyridyl)ethyloxycarbonyl, 2-(N,N-dicyclohexylcarboxyamido)ethyloxycarbonyl, 1-adamantyloxycarbonyl, vinyloxycarbonyl, allyloxycarbonyl, 1-isopropylallyloxycarbonyl, cinnamyloxycarbonyl, 4-nitrocinnamyloxycarbonyl, 8-quinolyloxycarbonyl, N-hydroxyperidinyloxycarbonyl, alkyldithiocarbonyl, benzyloxycarbonyl, p-methoxybenzyloxycarbonyl, p-nitrobenzyloxycarbonyl, p-bromobenzyloxycarbonyl, p-chlorobenzyloxycarbonyl, 2,4-dichlorobenzyloxycarbonyl, 4-methylsulfinylbenzyloxycarbonyl, 9-anthrylmethyloxycarbonyl, diphenylmethyloxycarbonyl, 9-fluorenylmethyloxycarbonyl, 9-(2,7-dibromo)fluorenylmethyloxycarbonyl, 2,7-di-tert-butyl[9-(10,10-dioxo-thioxanthyl)]methyloxycarbonyl, 4-methoxyphenacyloxycarbonyl, 2-methylthioethyloxycarbonyl, 2-methylsulfonylethyloxycarbonyl, 2-(p-toluenesulfonyl)ethyloxycarbonyl, [2-(1,3-dithianyl)]methyloxycarbonyl, 4-methylthiophenyloxycarbonyl, 2,4-dimethylthiophenyloxycarbonyl, 2-phosphonioethyloxycarbonyl, 2-triphenylphosphonioisopropyloxycarbonyl, 1,1-dimethyl-2-cyanoethyloxycarbonyl, m-chloro-p-acyloxybenzyloxycarbonyl, p-(dihydroxyboryl)benzyloxycarbonyl, 5-benzoisooxazolylmethyloxycarbonyl, 2-(trifluoromethyl)-6-chromonylmethyloxycarbonyl, phenyloxycarbonyl, m-nitrophenyloxycarbonyl, 3,5-dimethoxybenzyloxycarbonyl, o-nitrobenzyloxycarbonyl, 3,4-dimethoxy-6-nitrobenzyloxycarbonyl, and phenyl(o-nitrophenyl)methyloxycarbonyl. Inter alia, tert-butyloxycarbonyl, 2,2,2-trichloroethyloxycarbonyl, allyloxycarbonyl, benzyloxycarbonyl, and 9-fluorenylmethyloxycarbonyl are preferred.

The cyclic protecting group is a group of formula (IV-I) wherein $R^{a1}$ and $R^{a2}$ bond together to form a ring with the nitrogen atom of the amino group. Suitable cyclic protecting groups include, but are not limited to, N-phthaloyl, N-tetrachlorophthaloyl, N-4-nitrophthaloyl, N-dithiasucciloyl, N-2,3-dphenylmaleoyl, N-2,5-dimethylpyrrolyl, N-2,5-bis(triisopropylsiloxy)pyrrolyl, N-1,1,3,3-tetramethyl-1,3-disilaisoindolyl, 3,5-dinitro-4-pyridonyl, 1,3,5-dioxazinyl, and 2,2,5,5-tetramethyl-2,5-disil-1-azacyclopentane. Inter alia, N-phthaloyl is preferred.

The amino group having a protective group, represented by formula (IV-I), is preferably a group of the following formula (IV-I-I).

(IV-I-I)

Herein $R^{d1}$ and $R^{d2}$ are each independently a $C_1$-$C_6$ straight, branched or cyclic monovalent hydrocarbon group, and $R^{d1}$ and $R^{d2}$ may bond together to form a ring with the silicon atoms to which they are attached and the nitrogen atom therebetween. Suitable groups of $R^{d1}$ and $R^{d2}$ are as exemplified above for $R^d$.

In formula (IV-II), $R^b$ is a hydroxyl protecting group. Examples of the hydroxyl protecting group include, but are not limited to, $C_1$-$C_{10}$ monovalent hydrocarbon groups, $C_2$-$C_{10}$ alkoxyalkyl groups, tetrahydropyranyl, $C_2$-$C_{10}$ acyl groups, silyl type protecting groups of the formula: —Si($R^d$)$_3$, and carbonate type protecting groups of the formula: —OCOR$^e$.

Suitable $C_1$-$C_{10}$ monovalent hydrocarbon groups are as exemplified above for the monovalent hydrocarbon group, but of 1 to 10 carbon atoms. Suitable $C_2$-$C_{10}$ alkoxyalkyl groups include methoxymethyl, ethoxymethyl, propoxymethyl, butoxyethyl, benzyloxyethyl, methoxymethoxyethyl, 2-methoxyethoxymethyl, ethoxymethoxyethyl, and ethoxyethoxyethyl. Suitable acyl groups include saturated aliphatic acyl groups, unsaturated aliphatic acyl groups, and aromatic acyl groups, examples of which include formyl, acetyl, propionyl, butyryl, pivaloyl, acryloyl, methacryloyl, crotonoyl, benzoyl and cinnamoyl. Examples of the silyl type protecting group: —Si($R^d$)$_3$ and carbonate type protecting group: —OCOR$^e$ are as exemplified above.

In formula (IV-III), $R^{c1}$ and $R^{c2}$ are each independently a $C_1$-$C_6$ monovalent hydrocarbon group which may contain an oxygen atom. Also, $R^{c1}$ and $R^{c2}$ may bond together to form a cyclic acetal group.

Examples of the groups $R^{c1}$ and $R^{c2}$ include methyl, ethyl, n-propyl, isopropyl, n-butyl, isobutyl, tert-butyl, n-pentyl, n-hexyl, cyclopropyl, cyclobutyl, cyclopentyl, cyclohexyl and methoxyethyl.

In formulae (III-I), (III-II) and (V), $R^2$ is a $C_1$-$C_6$ divalent hydrocarbon group, oxyalkylene group or polyoxyalkylene group. Examples of the divalent hydrocarbon group include monovalent hydrocarbon groups, typically straight, branched or cyclic alkyl groups such as methyl, ethyl, n-propyl, isopropyl, n-butyl, isobutyl, tert-butyl, n-pentyl, n-hexyl, cyclopropyl, cyclobutyl, cyclopentyl, and cyclohexyl, with one hydrogen being eliminated therefrom. Suitable oxyalkylene groups include oxyethylene, oxypropylene, and oxybutylene. Suitable polyoxyalkylene groups include polyoxyethylene, polyoxypropylene, and polyoxybutylene.

In formulae (III-I), (III-II) and (V), $R^3$ is a $C_2$-$C_8$ divalent hydrocarbon group. Preferred are alkylene groups of 2 and 3 carbon atoms, especially ethylene and propylene. In the repeating units (—$R^3$—O—), there may be oxyalkylene groups of one type or a mixture of oxyalkylene groups of two or more types. Exemplary of the oxyalkylene group are oxyethylene and oxypropylene. When a mixture of oxyalkylene groups of two or more types is contained, the repeating units may result from either random or block polymerization of two or more different alkylene oxides.

In formulae (IV) and (V), $R^5$ is a $C_1$-$C_6$ divalent hydrocarbon group, examples of which are as exemplified above for $R^2$.

In formula (III-I), M is an alkali metal. Exemplary of the alkali metal are lithium, sodium, potassium and cesium.

In formula (IV), X is a leaving group. Suitable leaving groups include —Cl, —Br, —I, trifluoromethylsulfonyloxy (TfO), p-toluenesulfonyloxy (TsO), and methanesulfonyloxy (MsO), but are not limited thereto.

In formulae (III-I), (III-II) and (V), n is an integer of 1 to 450, preferably 10 to 400, and more preferably 20 to 350. It is noted that the polyalkylene glycol derivative obtained from the inventive method should preferably have a weight average molecular weight (Mw) of 500 to 18,000, more preferably 1,000 to 16,000, and be narrow disperse, typically having a dispersity (Mw/Mn) of up to 1.10, and more preferably up to 1.05. As used herein, Mw and Mn are measured versus polyethylene glycol standards by gel permeation chromatography (GPC).

The compound having formula (III-I) or (III-II) may be synthesized by any well-known methods.

Another embodiment of the invention is a method for preparing a polyalkylene glycol derivative having formula (V), the method starting with a compound having the formula (I) as starting reactant and comprising steps (1), (2-1), (3) and (4):

step (1) of reacting a compound having the formula (I) with an alkali metal or alkali metal compound selected from M, $M^+H^-$, $R_X^-M^+$, $[R_Y]^{\cdot-}M^+$ and $R_ZO^-M^+$ wherein M is an alkali metal, $R_X$ is a $C_1$-$C_{20}$ alkyl group or $C_7$-$C_{20}$ aralkyl group, $R_Y$ is an optionally substituted aromatic compound, $R_Z$ is a $C_1$-$C_6$ alkyl group, to synthesize a compound having the formula (II), step (2-1) of reacting the compound having the formula (II) with an alkylene oxide in a polymerization solvent to synthesize a compound having the formula (III-I), step (3) of reacting the compound having the formula (III-I) with an electrophile having the formula (IV) optionally in the presence of a basic compound, to synthesize a polyalkylene glycol derivative having the formula (V), and step (4) of removing water-soluble impurities with the aid of a cation exchange resin and an anion exchange resin, for thereby purifying the desired polyalkylene glycol derivative.

$R^1$—$R^2$—OH            (I)

$R^1$—$R^2$—$O^-M^+$           (II)

$R^1$—$R^2$—O$\text{-}$($R^3$—O$\text{-}$)$_{n-1}R^3$—$O^-M^+$      (III-I)

$R^4$—$R^5$—X            (IV)

$R^1$—$R^2$—O$\text{-}$($R^3$—O$\text{-}$)$_n R^5$—$R^4$      (V)

Herein $R^1$ to $R^5$, M, X and n are as defined above.

A further embodiment of the invention is a method for preparing a polyalkylene glycol derivative having formula (V), the method starting with a compound having the formula (I) as starting reactant and comprising steps (1), (2-1), (2-2), (3') and (4):

step (1) of reacting a compound having the formula (I) with an alkali metal or alkali metal compound selected from M, $M^+H^-$, $R_X^-M^+$, $[R_Y]^{\cdot-}M^+$ and $R_ZO^-M^+$ wherein M, $R^X$, $R^Y$, and $R^Z$ are as defined above, to synthesize a compound having the formula (II), step (2-1) of reacting the compound having the formula (II) with an alkylene oxide in a polymerization solvent to synthesize a compound having the formula (III-I), step (2-2) of reacting the compound having the formula (III-I) with an acidic compound to form a compound having the formula (III-II), step (3') of reacting the compound having the formula (III-II) with an electrophile having the formula (IV) in the presence of a basic compound, to synthesize a polyalkylene glycol derivative having the formula (V), and step (4) of removing water-soluble impurities with the aid of a cation exchange resin and an anion exchange resin, for thereby purifying the desired polyalkylene glycol derivative.

$R^1$—$R^2$—OH            (I)

$R^1$—$R^2$—$O^-M^+$           (II)

$R^1$—$R^2$—O$\text{-}$($R^3$—O$\text{-}$)$_{n-1}R^3$—$O^-M^+$      (III-I)

$R^1$—$R^2$—O$\text{-}$($R^3$—O$\text{-}$)$_{n-1}R^3$—OH      (III-II)

$R^4$—$R^5$—X            (IV)

$R^1$—$R^2$—O$\text{-}$($R^3$—O$\text{-}$)$_n R^5$—$R^4$      (V)

Herein $R^1$ to $R^5$, M, X and n are as defined above.

The steps are described in the order of time series.

Step (1)

Step (1) is to react a compound having the formula (I) with an alkali metal or alkali metal compound selected from M, $M^+H^-$, $R_X^-M^+$, $[R_Y]^{\cdot-}M^+$ and $R_ZO^-M^+$ to synthesize a compound having the formula (II).

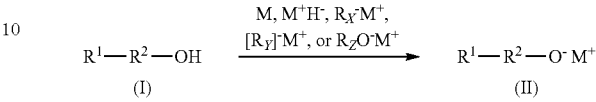

Herein $R^1$ and $R^2$ are as defined above. M is an alkali metal. $R_X$ is a $C_1$-$C_{20}$ straight, branched or cyclic alkyl group or $C_7$-$C_{20}$ aralkyl group. $R_Y$ is an optionally substituted aromatic compound. $R_Z$ is a $C_1$-$C_6$ straight, branched or cyclic alkyl group.

Examples of the alkali metal M include lithium, sodium, potassium, cesium, and sodium-potassium alloys.

Examples of the alkali metal compound $M^+H^-$ include sodium hydride and potassium hydride.

Exemplary groups of $R_X$ are the same alkyl groups as exemplified for the $C_1$-$C_{20}$ monovalent hydrocarbon group. Examples of the alkali metal compound $R_X^-M^+$ include ethyllithium, ethylsodium, n-butyllithium, sec-butyllithium, tert-butyllithium, 1,1-diphenylhexyllithium, 1,1-diphenyl-3-methylpentyllithium, 1,1-diphenylmethylpotassium, cumylsodium, cumylpotassium, and cumylcesium.

Examples of the alkali metal compound $[R_Y]^{\cdot-}M^+$ include lithium naphthalenide, sodium naphthalenide, potassium naphthalenide, anthracene lithium, anthracene sodium, anthracene potassium, biphenyl sodium, sodium 2-phenylnaphthalenide, phenanthrene sodium, sodium acenaphthylenide, sodium benzophenone ketyl, sodium 1-methylnaphthalenide, potassium 1-methylnaphthalenide, sodium 1-methoxynaphthalenide, and potassium 1-methoxynaphthalenide.

Exemplary groups of $R_Z$ include methyl, ethyl, n-propyl, isopropyl, n-butyl, sec-butyl, tert-butyl, n-pentyl, isopentyl, and n-hexyl, but are not limited thereto. Examples of the alkali metal compound $R_ZO^-M^+$ include sodium methoxide, potassium methoxide, sodium ethoxide, potassium ethoxide, and potassium tert-butoxide.

Of the alkali metals or alkali metal compounds, sodium, potassium, sodium hydride and potassium hydride are preferred from the standpoint of suppressing side reactions. Also, sodium naphthalenide, potassium naphthalenide, anthracene sodium, anthracene potassium, sodium methoxide, potassium methoxide, sodium ethoxide and potassium ethoxide are preferred from the standpoint of high reactivity. The alkali metals or alkali metal compounds may be used alone or in admixture.

In step (1), the amount of the alkali metal or alkali metal compound used is preferably 0.5 to 3.0 equivalents, more preferably 0.8 to 2.0 equivalents, even more preferably 0.9 to 1.0 equivalent per equivalent of the compound having formula (I). Where the alkali metal compound used herein will function as a polymerization initiator in the subsequent step (2-1), the amount of the alkali metal compound used should be up to 1.0 equivalent. Also where potassium methoxide or another alkali metal compound capable of forming an alcohol after reaction with a compound having formula (1) is used, the alcohol formed in step (1) must be distilled off in vacuum after the synthesis of the compound having formula (II) and it is also necessary to prevent the potassium methoxide from being left after step (1) and functioning as a polymerization initiator in subsequent step (2-1).

In step (1) of reaction to synthesize the compound having formula (II), the reaction may be performed by adding the compound having formula (1) and the alkali metal or alkali metal compound to a suitable solvent and mixing them. Alternatively, a mixture of the alkali metal or alkali metal compound and a suitable solvent may be added dropwise to the compound having formula (1); or the compound having formula (1) may be added dropwise to a mixture of the alkali metal or alkali metal compound and a suitable solvent.

Examples of the solvent used in step (1) include ethers such as tetrahydrofuran (THF) and 1,4-dioxane, and aromatic hydrocarbons such as benzene, toluene, and xylene. The solvent is preferably the same as used in subsequent step (2-1) as polymerization solvent. A solvent which has been distilled in the presence of a dehydrating agent such as metallic sodium is preferred. The amount of the solvent used is preferably 1 to 50 times, more preferably 2 to 10 times, even more preferably 2 to 5 times the weight of the compound having formula (I), although not limited thereto.

The reaction of step (1) is performed at a temperature of preferably −78° C. to 150° C., more preferably from 0° C. to the reflux temperature of the solvent used (for example, 0° C. to 66° C., reflux temperature of THF). The reaction system may be cooled or heated if necessary.

The concentration (mmol/g) of a substance serving as a polymerization initiator in the reaction solution at the end of step (1) (i.e., the reaction solution after synthesis of a polymerization initiator) may be determined from the amount of reactant alcohol having formula (I) used in step (1) and the overall weight of the reaction solution at the end of step (1). That is, the concentration of a substance serving as a polymerization initiator in the reaction solution at the end of step (1) may be determined as [amount (mmol) of reactant alcohol (I) used in step (1)]/[overall weight (g) of the reaction solution at the end of step (1)]. This is because if the reactant alcohol having formula (I) is left in the reaction solution at the end of step (1), that reactant alcohol also functions as the polymerization initiator. Since the reaction of subsequent step (2-1) is equilibration reaction, the compound having formula (II) functions as the polymerization initiator, the thus formed polymer terminal alkoxide withdraws a proton from the reactant alcohol (I), and the reactant alcohol (I) functions as an alkoxide or polymerization initiator.

It is therefore desirable that the amount of reactant alcohol left in the reaction solution at the end of step (1) be as small as possible. The reaction solution at the end of step (1) may be used as the polymerization initiator solution in the subsequent step (2-1) without further treatment.

Step (2-1)

Step (2-1) is to react the compound having the formula (II) (i.e., polymerization initiator) with an alkylene oxide having the formula (VI) in a polymerization solvent to synthesize a compound having the formula (III-I).

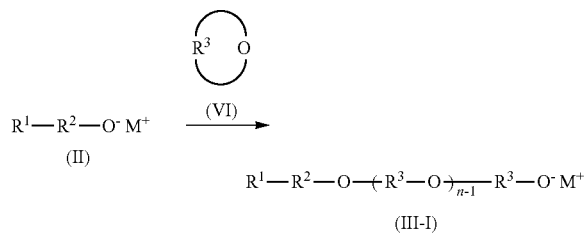

Herein $R^1$, $R^2$, $R^3$, M and n are as defined above.

Suitable alkylene oxides include ethylene oxide, propylene oxide, and butylene oxide. Inter alia, ethylene oxide and propylene oxide are preferred because of easy polymerization.

The polymerization solvent used in step (2-1) is preferably selected from $C_4$-$C_{10}$ cyclic ether compounds and $C_4$-$C_{10}$ linear or branched ether compounds because they are fully compatible with the polymerization initiator.

Examples of the cyclic ether compound include, but are not limited to, furan, 2,3-dihydrofuran, 2,5-dihydrofuran, 2,3-dimethylfuran, 2,5-dimethylfuran, tetrahydrofuran (THF), 2-methyltetrahydrofuran, 3-methyltetrahydrofuran, 2,5-dimethyltetrahydrofuran, 1,2-methylenedioxybenzene, 1,3-dioxolane, 2-methyl-1,3-dioxolane, 4-methyl-1,3-dioxolane, 2,2-dimethyl-1,3-dioxolane, 3,4-dihydroxy-2H-pyran, tetrahydropyran, 1,3-dioxane, 1,4-dioxane, 2,4-dimethyl-1,3-dioxane, 1,4-benzodioxane, 1,3,5-trioxane, and oxepane.

Examples of the linear or branched ether compound include, but are not limited to, monoethylene glycol dimethyl ether, diethylene glycol monomethyl ether, diethylene glycol dimethyl ether, and triethylene glycol dimethyl ether. Besides, an organic solvent other than the ether compound may be used. Examples of the organic solvent include aromatic hydrocarbons such as benzene, toluene, and xylene, though are not limited thereto.

The polymerization solvent may be used alone or in admixture of two or more. Where two or more organic solvents are used in admixture, the combination and the mixing ratio of solvents is not particularly limited.

The amount of the polymerization solvent used is preferably 1 to 50 times, more preferably 2 to 30 times, even more preferably 3 to 20 times the weight of the alkylene oxide used, though not particularly limited. The preferred polymerization solvent is a solvent which has been distilled in the presence of a dehydrating agent such as metallic sodium. The polymerization solvent should preferably have a water content of up to 50 ppm, more preferably up to 10 ppm, even more preferably up to 5 ppm.

In step (2-1), the alkylene oxide may be added in one portion to a reaction system having the compound of formula (II) dissolved in the polymerization solvent, or a solution of the alkylene oxide in the polymerization solvent may be added dropwise to the reaction system. The polymerization reaction is performed at a temperature of preferably 30° C. to 60° C., more preferably 40° C. to 60° C., even more preferably 45° C. to 60° C. The extent of polymerization reaction may be monitored with GPC, and the time when the conversion ratio of the alkylene oxide ceases to change is assumed the end of reaction. On use of the compound having formula (II) serving as a polymerization initiator, the polymerization may be performed under mild conditions without a need for severe reaction conditions such as high temperature and high pressure.

The reaction solution at the end of step (2-1) may be used as such in the subsequent step (3) of reaction with an electrophile.

Step (2-2)

Alternatively, the compound of formula (III-I) resulting from step (2-1) is quenched with an acidic compound and converted to a compound having the formula (III-II) prior to the subsequent step. Preferably the compound having formula (III-II) is prepared and purified prior to the subsequent step.

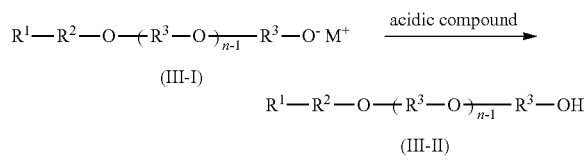

Herein $R^1$, $R^2$, $R^3$, M and n are as defined above.

In the embodiment involving purification, after the quenching, the resulting compound having the formula (III-II) is analyzed, for example, by $^1$H-NMR spectroscopy, to confirm whether or not the desired product has been synthesized by polymerization of step (2-1). After a low molecular weight fraction formed during polymerization is removed from the reaction system by dropwise addition to a poor solvent for crystallization, the system proceeds to reaction with an electrophile. This procedure prevents any reaction of a low molecular weight fraction with an electrophile.

Examples of the acidic compound used for quenching include, but are not limited to, carboxylic acids such as formic acid, acetic acid, propionic acid, succinic acid, citric acid, tartaric acid, fumaric acid, malic acid, and trifluoroacetic acid, mineral acids such as hydrochloric acid, sulfuric acid, nitric acid, phosphoric acid and perchloric acid, sulfonic acids such as benzenesulfonic acid and p-toluenesulfonic acid, and solid acids such as Amberlyst® series from Dow Chemical Co. The amount of the acidic compound used is preferably 1 to 10 equivalents, more preferably 1 to 5 equivalents, even more preferably 1 to 2 equivalents per equivalent of the compound having formula (III-I). The acidic compounds may be used alone or in admixture. When a mixture of acidic compounds is used, the mixing ratio is not particularly limited.

The quenching may be followed directly by crystallization in a poor solvent. Alternatively, the solvent may be replaced by a good solvent, prior to crystallization. Suitable good solvents include, but are not limited to, ethers such as THF and 1,4-dioxane, aromatic hydrocarbons such as benzene, toluene and xylene, esters such as ethyl acetate, n-butyl acetate and γ-butyrolactone, ketones such as acetone, methyl ethyl ketone and methyl isobutyl ketone, dimethylsulfoxide (DMSO), N,N-dimethylformamide (DMF), and acetonitrile. The solvents may be used alone or in admixture. When a mixture of solvents is used, the mixing ratio is not particularly limited. After the solvent displacement, the concentration of the compound having formula (III-II) is preferably 10 to 50% by weight, more preferably 15 to 45% by weight, even more preferably 20 to 40% by weight.

The poor solvent used herein is one in which the compound of formula (III-II) is less soluble. Preferred poor solvents include hydrocarbons such as hexane, heptane, octane, nonane, decane, cyclopentane, cyclohexane, cycloheptane, and cyclooctane, and ethers such as diethyl ether, diisopropyl ether and di-n-butyl ether. The amount of the poor solvent used is preferably 5 to 100 times, more preferably 5 to 50 times, even more preferably 5 to 20 times the weight of the compound having formula (III-II). The poor solvents may be used alone or in admixture. Also a mixture of a poor solvent and another solvent may be used. Suitable other solvents which can be mixed with the poor solvent include, but are not limited to, esters such as ethyl acetate, n-butyl acetate and γ-butyrolactone, ketones such as acetone, methyl ethyl ketone and methyl isobutyl ketone, hydrocarbons such as benzene, toluene, xylene and cumene, ethers such as THF, diethyl ether and 1,4-dioxane, alcohols such as methanol, ethanol, 2-propanol, and ethylene glycol monomethyl ether, DMSO, DMF, and acetonitrile. When a mixture of poor solvents is used, the mixing ratio is not particularly limited.

After the compound having formula (III-II) is precipitated in solid form via crystallization, the solid may be purified by washing if necessary. The solvent used for washing is desirably the same as the poor solvent although the type and amount of washing solvent are not particularly limited. The resulting solid is dried under reduced pressure. In this way, the compound having formula (III-II) is recovered in solid form.

Step (3)

Step (3) is to react the compound having formula (III-I) with an electrophile having the formula (IV) optionally in the presence of a basic compound, to synthesize a polyalkylene glycol derivative having the formula (V).

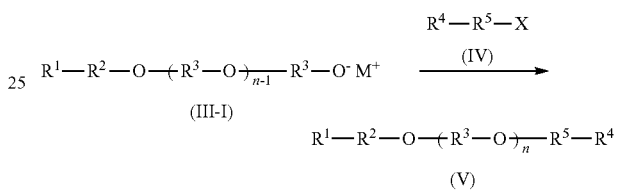

Herein $R^1$, $R^2$, $R^3$, $R^4$, $R^5$, M, X and n are as defined above.

In step (3), the compound having formula (III-I) resulting from step (2-1) is subjected, preferably as such, i.e., without purification, to the reaction with an electrophile having formula (IV). This direct process achieves a cost reduction associated with simplification of isolation/purification step, and suppresses any lowering of production yield due to adhesion to the polymer production equipment and dissolution in poor solvent.

In step (3), the reaction solution resulting from step (2-1) may be used as such, or concentrated prior to use. In the latter case, the reaction solution is concentrated until the concentration of the compound having formula (III-I) reaches preferably 10 to 50% by weight, more preferably 15 to 45% by weight, even more preferably 20 to 40% by weight. In the reaction of step (3), preferably the electrophile having formula (IV) is added to the reaction solution resulting from step (2-1) or the concentrate thereof. As to the addition of the electrophile having formula (IV) to the reaction system, the electrophile may be added to the reaction system in one portion or a solution of the electrophile in a suitable solvent may be added dropwise to the reaction system. Examples of the solvent used in the latter case include the solvents exemplified as the polymerization solvent in step (2-1). The amount of the electrophile having formula (IV) used is preferably 1 to 20 equivalents, more preferably 1 to 5 equivalents, even more preferably 1 to 3 equivalents per equivalent of the compound having formula (III-I).

Although the reaction of step (3) takes place without a need for catalysts, a basic compound may be added to the reaction system to accelerate the reaction. Suitable basic compounds include potassium hydroxide, sodium hydroxide, and potassium tert-butoxide, but are not limited thereto. The amount of the basic compound added is preferably 1 to 10 equivalents, more preferably 1 to 5 equivalents, even more preferably 1 to 2 equivalents per equivalent of the compound having formula (III-I).

The reaction of step (3) may be performed at a temperature of preferably 30 to 60° C., more preferably 30 to 50° C., even more preferably 30 to 45° C. The reaction may be monitored with $^1$H-NMR spectroscopy, and the time when the conversion ratio ceases to change is considered the end of reaction.

At the end of reaction of step (3), the reaction solution may proceed to the subsequent step just after the precipitated salt is filtered off.

Alternatively, the compound having formula (V), which is the reaction product of step (3), may be taken out as solid from the reaction system prior to the subsequent step. In this case, the reaction solution resulting from step (3) may be, as such or after concentration, added dropwise to a poor solvent, whereby the compound having formula (V) crystallizes. In the concentration mode, the reaction solution is concentrated until the concentration of the compound having formula (V) reaches preferably 10 to 50% by weight, more preferably 15 to 45% by weight, even more preferably 20 to 40% by weight. Also prior to crystallization, the salt resulting from etherifying reaction is removed from the reaction solution by filtration, whereby the compound of formula (V) having a low impurity content is recovered.

Step (3')

In the embodiment wherein the compound having formula (III-II) is prepared via step (2-2) after step (2-1), the compound having formula (III-II) is dissolved in a suitable solvent and then reacted with an electrophile having formula (IV) in the presence of a basic compound, to synthesize a polyalkylene glycol derivative having formula (V).

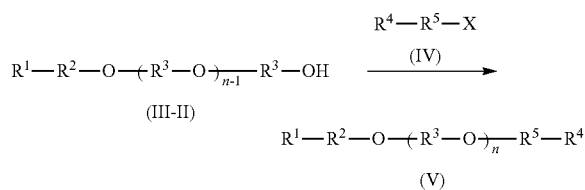

Herein $R^1$, $R^2$, $R^3$, $R^4$, $R^5$, X and n are as defined above.

The solvent used in this step may be selected from the same solvents as exemplified as the polymerization solvent in step (2-1).

Examples of the basic compound used in the reaction of the compound having formula (III-II) with the electrophile (IV) include potassium hydroxide, sodium hydroxide, and potassium tert-butoxide, but are not limited thereto. The amount of the basic compound added is preferably 1 to 10 equivalents, more preferably 1 to 5 equivalents, even more preferably 1 to 2 equivalents per equivalent of the compound having formula (III-II).

Reaction conditions (such as temperature) during the reaction of the compound having formula (III-II) with the electrophile (IV) may be the same as those during the reaction of the compound having formula (III-I) with the electrophile (IV). The compound having formula (V) obtained from reaction of the compound having formula (III-II) with the electrophile (IV) may be taken out in solid form from the reaction system before it is used in the subsequent step. The way of taking out is the same as the way of taking out the compound having formula (V) in step (3).

Deprotection Step

In the case of the compound having formula (V) wherein at least one of $R^1$ and $R^4$ is an amino or hydroxyl group containing a protecting group which can be deprotected under acidic conditions or an acetal group, the compound having formula (V) resulting from step (3) or (3') may be deprotected before it proceeds to step (4).

Examples of the protecting group which can be deprotected include trialkylsilyl, tert-butyl, methoxymethyl and tert-butyloxycarbonyl, but are not limited thereto.

In the embodiment involving the deprotection step, preferably the compound having formula (V) resulting from step (3) or (3') is dissolved in a solvent, reacted with an acid, and then subjected, without post-treatment, to step (4) of ion exchange resin purification.

The solvent used herein is typically a $C_1$-$C_6$ alcohol or water because the compound having formula (V) is highly soluble therein, and the solvent is also applicable to step (4) of ion exchange resin purification. Suitable alcohols include methanol, ethanol, 1-propanol, 2-propanol, 1-butanol, and tert-butyl alcohol. Inter alia, methanol and ethanol are preferred because the compound having formula (V) is highly soluble therein and the solvent is readily removed in the subsequent step.

Examples of the acid include, but are not limited to, carboxylic acids such as formic acid, acetic acid, propionic acid, succinic acid, citric acid, tartaric acid, fumaric acid, malic acid, and trifluoroacetic acid, mineral acids such as hydrochloric acid, sulfuric acid, nitric acid, phosphoric acid and perchloric acid, sulfonic acids such as benzenesulfonic acid and p-toluenesulfonic acid, and cation exchange resins. The amount of the acid used is preferably 0.01 to 1,000 equivalents, more preferably 0.1 to 100 equivalents, even more preferably 1 to 10 equivalents per equivalent of the compound having formula (V). The acids may be used alone or in admixture. When a mixture of acids is used, the mixing ratio is not particularly limited.

When a cation exchange resin is used as the acid catalyst, a solution of the compound having formula (V) resulting from step (3) or (3') is passed through a cation exchange resin packed column. As to the passage mode, the solution may either flow through the column or circulate in the column. When the solution passes through the column in a circulating manner, deprotection may be effectively achieved with a smaller amount of the cation exchange resin. In the case of circulatory flow deprotection, the solution preferably circulates at least two passes, preferably at least six passes in the column.

Examples of the cation exchange resin used for deprotection include, but are not limited to, styrenic strong acid cation exchange resins such as Amberlite® series (e.g., IR120B, IR124B, 200CT, 252) from Dow Chemical Co., Amberjet® series (e.g., 1020, 1024, 1060, 1220) from Dow Chemical Co., Diaion® series (e.g., SK104, SK1B, SK110, SK112, PK208, PK212, PK216, PK218, PK220, PK228, UBK08, UBK10, UBK12, UBK510L, UBK530, UBK550) from Mitsubishi Chemical Co., Ltd., and Dowex® series (e.g., 50 W×2 50-100, 50 W×2 100-200, 50 W×4 100-200, 50 W×8 50-100, 50 W×8 100-200, 50 W×8 200-400, HCR-S, HCR-W2(H)) from Dow Chemical Co. Among others, strong acid cation exchange resins of gellular type or porous type having a degree of crosslinking of at least 10 are preferred because they are unlikely to adsorb the compound having formula (V) and deprotected form thereof. Examples of the strong acid cation exchange resin of gellular type include Amberlite® series (e.g., IR120B, IR124B) from Dow Chemical Co., Amberjet® series (e.g., 1020, 1024, 1060, 1220) from Dow Chemical Co., Diaion® series (e.g., SK104, SK1B, SK110, SK112, UBK08, UBK10, UBK12, UBK510L, UBK530, UBK550) from Mitsubishi Chemical Co., Ltd. Examples of the strong acid cation exchange resin of porous type having a degree of crosslinking of at least 10 include Amberlite® series (e.g., 200CT) from Dow Chemical Co. and Diaion® series (e.g., PK220, PK228) from Mitsubishi Chemical Co., Ltd.

In the case of a Na type cation exchange resin, the cation exchange resin must be treated with an acidic compound prior to use. Examples of the acidic compound used herein include inorganic acids such as hydrochloric acid, sulfuric acid, nitric acid, phosphoric acid, and perchloric acid, but are not limited thereto. The amount of the acidic compound used is preferably 1 to 15 times, more preferably 1 to 10 times, even more preferably 1 to 8 times the weight of the cation exchange resin. After the pre-treatment of the cation exchange resin with an acidic compound, the resin is washed with water to remove the acidic compound, and then optionally with a water-soluble organic solvent such as methanol or ethanol to remove water whereupon the resin is ready for use. For this reason, it is preferred for process simplification to use a previously regenerated H type cation exchange resin.

The deprotection reaction is performed at a temperature from 0° C. to the reflux temperature of the solvent used, preferably at 20° C. to 40° C.

Step (4)

Step (4) is to remove water-soluble impurities from the reaction solution resulting from step (3) or (3') with the aid of a cation exchange resin and an anion exchange resin, for thereby purifying the desired polyalkylene glycol derivative. More particularly, step (4) is to let the ion exchange resins adsorb water-soluble impurities formed during step (3) or (3'), that is, by-products, basic compound and optional acid used for deprotection, for thereby removing the water-soluble impurities. Notably, the by-products are salts between anions resulting from the leaving group on the electrophile having formula (IV) and cations resulting from the compound having formula (III-I) and basic compound.

Examples of the cation exchange resin used in step (4) include, but are not limited to, styrenic strong acid cation exchange resins such as Amberlite® series (e.g., IR120B, IR124B, 200CT, 252) from Dow Chemical Co., Amberjet® series (e.g., 1020, 1024, 1060, 1220) from Dow Chemical Co., Diaion® series (e.g., SK104, SK1B, SK110, SK112, PK208, PK212, PK216, PK218, PK220, PK228, UBK08, UBK10, UBK12, UBK510L, UBK530, UBK550) from Mitsubishi Chemical Co., Ltd., and Dowex® series (e.g., 50 W×2 50-100, 50 W×2 100-200, 50 W×4 100-200, 50 W×8 50-100, 50 W×8 100-200, 50 W×8 200-400, HCR-S, HCR-W2(H)) from Dow Chemical Co. Among others, strong acid cation exchange resins of gellular type or porous type having a degree of crosslinking of at least 10 are preferred because they are unlikely to adsorb the compound having formula (V) and deprotected form thereof. The amount of the cation exchange resin used is preferably 0.1 to 50 times, more preferably 0.2 to 5 times, even more preferably 0.2 to 1 time the weight of the compound having formula (V).

In the case of a Na type cation exchange resin, the cation exchange resin must be treated with an acidic compound prior to use. Examples of the acidic compound used herein include inorganic acids such as hydrochloric acid, sulfuric acid, nitric acid, phosphoric acid, and perchloric acid, but are not limited thereto. The amount of the acidic compound used is preferably 1 to 15 times, more preferably 1 to 10 times, even more preferably 1 to 8 times the weight of the cation exchange resin. After the pre-treatment of the cation exchange resin with an acidic compound, the resin is washed with water to remove the acidic compound, and then optionally with a water-soluble organic solvent such as methanol or ethanol to remove water whereupon the resin is ready for use. For this reason, it is preferred for process simplification to use a previously regenerated H type cation exchange resin.

Examples of the anion exchange resin used in step (4) include, but are not limited to, styrenic strong base anion exchange resins such as Amberlite® series (e.g., IRA400J, IRA402BL, IRA404J, IRA900J, IRA904, IRA458RF, IRA958, IRA410J, IRA411, IRA910CT) from Dow Chemical Co., Amberjet® series (e.g., 4400, 4002, 4010) from Dow Chemical Co., Diaion® series (e.g., SA10A, SA12A, SA11A, NSA100, UBA120, PA306S, PA308, PA316, PA318L, HPA25, SA20A, SA21A, PA408, PA412, PA418) from Mitsubishi Chemical Co., Ltd., and Dowex® series (e.g., 1×2 50-100, 1×2 100-200, 1×4 20-50, 1×4 50-100, 1×4 100-200, 1×8 50-100, 1×8 100-200, 1×8 200-400, SBR-PC, MARATHON A, MARATHON MSA, MONOSPHERE 550A, MSA-2, MARATHON A2) from Dow Chemical Co. The amount of the anion exchange resin used is preferably 0.1 to 50 times, more preferably 0.2 to 5 times, even more preferably 0.5 to 2 times the weight of the compound having formula (V).

In the case of a Cl type anion exchange resin, the anion exchange resin must be treated with a basic compound prior to use. Examples of the basic compound used herein include inorganic bases such as sodium hydroxide and potassium hydroxide, but are not limited thereto. The amount of the basic compound used is preferably 1 to 15 times, more preferably 1 to 10 times, even more preferably 1 to 8 times the weight of the anion exchange resin. After the pre-treatment of the anion exchange resin with a basic compound, the resin is washed with water to remove the basic compound, and then optionally with a water-soluble organic solvent such as methanol or ethanol to remove water whereupon the resin is ready for use. For this reason, it is preferred for process simplification to use a previously regenerated OH type anion exchange resin.

The step of reacting the reaction product from step (3) or (3') with ion exchange resins may be performed by passing a reaction product solution through an ion exchange resin packed column, or by adding ion exchange resins to a reaction product solution and stirring and mixing. The procedure of passing a reaction product solution through an ion exchange resin packed column is preferred. As to the passage mode, the solution may either flow through the column or circulate in the column. The passage of the solution through the column in a circulating manner is preferred in that water-soluble impurities are effectively removed. In the case of circulatory flow purification, the solution preferably circulates at least two passes, preferably at least six passes in the column. Separate columns may be packed with the cation exchange resin and the anion exchange resin, or a common column may be packed with a mixture of cation and anion exchange resins.

In the case of the compound having formula (V) wherein at least one of $R^1$ and $R^4$ is an amino or hydroxyl group containing a protecting group which can be deprotected under acidic conditions or an acetal group, the anion exchange resin packed column is set downstream of the cation exchange resin packed column, and a solution of the compound having formula (V) resulting from step (3) or (3')

is passed through the series of columns whereby deprotection and purification of step (4) can be simultaneously performed.

The solvent used herein is typically a $C_1$-$C_6$ alcohol or water because the compound having formula (V) is highly soluble therein, and the solvent is adequate to the ion exchange resin purification. Suitable alcohols include methanol, ethanol, 1-propanol, 2-propanol, 1-butanol, and tert-butyl alcohol. Inter alia, methanol and ethanol are preferred because the compound having formula (V) is highly soluble therein and the solvent is readily removed in the subsequent step.

The ion exchange resin treatment of the solution may be followed directly by crystallization in a poor solvent. Alternatively, the solvent may be replaced by a good solvent, prior to crystallization. Suitable good solvents include, but are not limited to, ethers such as THF and 1,4-dioxane, aromatic hydrocarbons such as benzene, toluene and xylene, esters such as ethyl acetate, n-butyl acetate and γ-butyrolactone, ketones such as acetone, methyl ethyl ketone and methyl isobutyl ketone, DMSO, NDMF, and acetonitrile. The solvents may be used alone or in admixture. When a mixture of solvents is used, the mixing ratio is not particularly limited. After the solvent displacement, the concentration of the compound having formula (V) is preferably 5 to 50% by weight, more preferably 10 to 40% by weight.

The poor solvent used herein is one in which the compound of formula (V) is less soluble. Preferred poor solvents include hydrocarbons such as hexane, heptane, octane, nonane, decane, cyclopentane, cyclohexane, cycloheptane, and cyclooctane, and ethers such as diethyl ether, diisopropyl ether and di-n-butyl ether. The amount of the poor solvent used is preferably 5 to 100 times, more preferably 5 to 50 times, even more preferably 5 to 20 times the weight of the compound having formula (V). The poor solvents may be used alone or in admixture. Also a mixture of a poor solvent and another solvent may be used. Suitable other solvents which can be mixed with the poor solvent include, but are not limited to, esters such as ethyl acetate, n-butyl acetate and γ-butyrolactone, ketones such as acetone, methyl ethyl ketone and methyl isobutyl ketone, hydrocarbons such as benzene, toluene, xylene and cumene, ethers such as THF, diethyl ether and 1,4-dioxane, alcohols such as methanol, ethanol, 2-propanol, and ethylene glycol monomethyl ether, DMSO, DMF, and acetonitrile. When a mixture of solvents is used, the mixing ratio is not particularly limited.

After the compound having formula (V) is precipitated in solid form via crystallization, the solid may be purified by washing if necessary. The solvent used for washing is desirably the same as the poor solvent although the type and amount of washing solvent are not particularly limited. The resulting solid is dried under reduced pressure, after which the compound having formula (V) is recovered in solid form.

It is noted that when water is used as the solvent in step (4), the compound having formula (V) may be recovered by freeze drying the aqueous solution thereof. The freeze drying procedure, however, is sometimes difficult to implement on an industrial scale because a special equipment is necessary for freeze drying, and a long time is taken until water is completely removed. In the preferred embodiment, crystallization is performed as mentioned above because both the system and process can be simplified.

The polyalkylene glycol derivative obtained from the inventive method has a heavy metal impurity content of not more than 100 ppb, more preferably not more than 10 ppb (parts per billion). The heavy metal impurity content is generally measured by an inductively coupled plasma mass spectrometry (ICP-MS) although the measurement method is not limited thereto. On analysis by ICP-MS, a polymer sample is diluted with a solvent prior to measurement. It is essential that the polymer be soluble in the solvent and the solvent be free of metals. The preferred solvents are ultrapure water and N-methyl-2-pyrrolidone for use in the electronic industry, but not limited thereto. The dilution factor is preferably 10 to 10,000 times, more preferably 50 to 1,000 times, but not limited thereto.

In the polyalkylene glycol derivative, the content of alkali metal ions resulting from the alkali metal or alkali metal compound used in step (1) or step (3) or (3') is preferably not more than 50 ppm, more preferably not more than 10 ppm. The alkali metal ion content is measured by a commercial alkali metal ion meter such as a compact sodium ion meter or compact potassium ion meter (Horiba, Ltd.). The alkali metal ion content of the reaction solution resulting from step (3) or (3') is at least 2,000 ppm. This means that the purifying method (especially step (4)) of the invention allows alkali metal ions to be effectively removed using a smaller amount of ion exchange resins.

EXAMPLE

Synthesis Examples, Examples and Comparative Examples are given below for further illustrating the invention although the invention is not limited thereto. The weight average molecular weight (Mw) and number average molecular weight (Mn) are measured versus polyethylene glycol standards by GPC. The GPC measurement was performed under the following conditions:

Column: PL-gel MIXED-D, two columns
Mobile phase: DMF (0.01 mol/L lithium bromide solution)
Column oven temperature: 65° C.
Sample concentration: 0.20 wt %
Sample injection volume: 100 μL
Flow rate: 0.7 mL/min 1) Synthesis of Electrophile Synthesis Example 1

Synthesis of Electrophile (IVa)
(1) Synthesis of Intermediate (IVa-1)

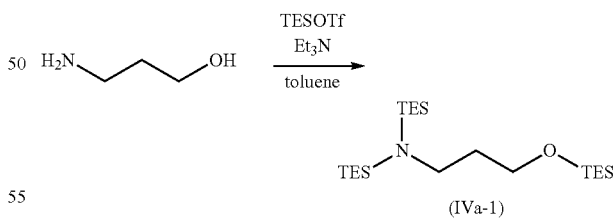

(IVa-1)

A 10-L four neck flask was charged with 237.6 g of 3-amino-1-propanol, 1,183.0 g of triethylamine, and 711.8 g of toluene. In nitrogen atmosphere, 3,008.9 g of triethylsilyltrifluoromethane sulfonate (TESOTf) was added dropwise to the solution, which was stirred at 80° C. for 16 hours. The reaction solution was transferred to a separatory funnel whereupon a lower layer was separated off. The upper layer was then washed with cold water and saturated saline. $NaSO_4$, active carbon and aluminum oxide were added to the solution, which was stirred for 1 hour. This was followed by Celite® filtration and vacuum distillation, obtaining 1,225.8 g (yield 92%) of Intermediate (IVa-1).

Intermediate (IVa-1)
colorless liquid
b.p. 152° C./30 Pa
$^1$H-NMR (500 MHz, CDCl$_3$): δ=0.60 (18H, q), 0.94 (27H, t), 1.62 (2H, m), 2.83 (2H, m), 3.54 (2H, t)

(2) Synthesis of Intermediate (IVa-2)

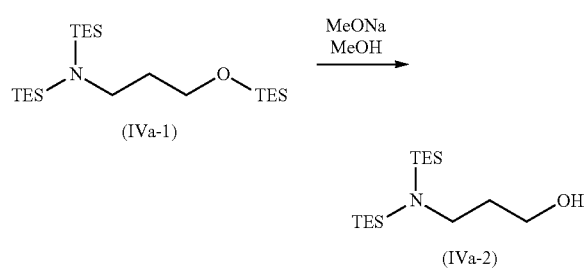

A 5-L flask was charged with 1,254.7 g of Silyl protected compound (IVa-1), 1,000.0 g of methanol and 28.9 g of 28 wt % methanol solution of sodium methoxide, which were stirred at 60° C. for 5 hours. From the solution, triethylmethoxysilane was distilled off in vacuum, after which 850.0 g of methanol was added to the residue, which was stirred again at 60° C. Similar procedure was repeated to complete the reaction. The reaction solution was quenched with sodium hydrogencarbonate. After solvent replacement by toluene, the salt was removed by filtration. Thereafter, active carbon and aluminum oxide were added to the solution, which was stirred for 1 hour and filtered through Celite®. Toluene was distilled off in vacuum, obtaining 893.3 g (crude yield 99%) of Intermediate (IVa-2). This crude product had a sufficient purity as the intermediate and was directly used in the next step.

Intermediate (IVa-2)
colorless liquid
$^1$H-NMR (500 MHz, CDCl$_3$): δ=0.60 (12H, q), 0.93 (18H, t), 1.67 (2H, m), 2.85 (2H, m), 3.59 (2H, m)

(3) Synthesis of Electrophile (IVa)

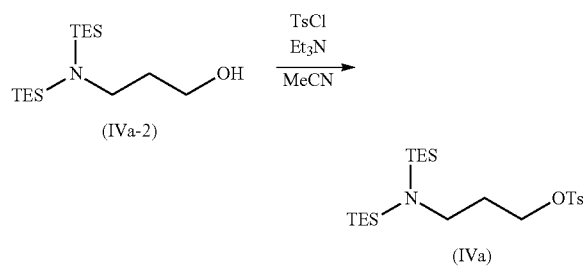

A 10-L four neck flask was charged with 760.7 g of Intermediate (IVa-2), 761 g of triethylamine, and 880.0 g of acetonitrile. In nitrogen atmosphere, a solution of 717.2 g of p-toluenesulfonyl chloride (TsCl) in 1,440.0 g of acetonitrile was added dropwise to the flask under ice cooling. The solution was stirred for 3.5 hours under ice cooling, quenched with water, transferred to a separatory funnel, and extracted with toluene. The organic layer was then washed with water and saturated saline and dried over NaSO$_4$, after which the solvent was distilled off in vacuum. The crude product was dissolved in hexane. Active carbon and aluminum oxide were added to the solution, which was stirred for 1 hour, and Celite® filtered. Thereafter hexane was distilled off in vacuum, obtaining 1,067.1 g (crude yield 93%) of Electrophile (IVa). This crude product had a sufficient purity ready for use in the subsequent step.

Electrophile (IVa)
pale yellow liquid
$^1$H-NMR (500 MHz, CDCl$_3$): δ=0.54 (12H, q), 0.89 (18H, t), 1.68 (2H, m), 2.45 (3H, s), 2.71 (2H, m), 3.98 (2H, t)

2) Synthesis of Polymerization Initiator

Example 1

Synthesis of Polymerization Initiator (IIa)

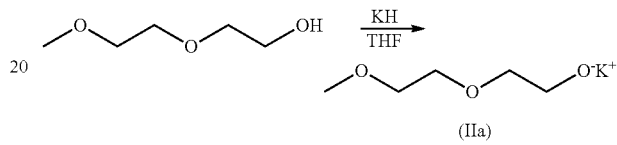

(1) Distillation of Diethylene Glycol Monomethyl Ether

A distillation setup was assembled by placing a stirrer in a 500-mL two neck recovery flask, and connecting thereto a rectifying tube, a thermometer, a Liebig condenser, a fractionating column, two 50-mL recovery flasks, and a 300-mL two neck flask. While the setup was kept in a vacuum of up to 10 Pa, it was internally heated by means of an oil bath and a heat gun to remove water in the setup. Subsequently, under nitrogen stream, diethylene glycol monomethyl ether (Tokyo Chemical Industry Co., Ltd.) was fed into the 500-mL two neck recovery flask and distilled under reduced pressure. The water content after distillation was measured by a Karl Fisher moisture meter, finding a water content of up to 1 ppm.

(2) Distillation of Tetrahydrofuran (THF)

A distillation setup was assembled by placing a stirrer in a 3-L two neck recovery flask, and connecting thereto a rectifying tube, a thermometer, a Dimroth condenser, a fractionating column, a 200-mL recovery flask, and a 2-L two neck flask. While the setup was kept in a vacuum of up to 10 Pa, it was internally heated by means of an oil bath and a heat gun to remove water in the setup. Subsequently, under nitrogen stream, anhydrous THF (Kanto Chemical Co., Ltd.), metallic sodium pieces (Kanto Chemical Co., Ltd.), and benzophenone (Tokyo Chemical Industry Co., Ltd.) were fed into the 3-L two neck recovery flask and refluxed under normal pressure for 5 hours. After it was confirmed that the contents in the 3-L two neck recovery flask turned bluish purple, the distilled THF was taken out in the 2-L two neck flask. The water content after distillation was measured by a Karl Fisher moisture meter, finding a water content of up to 1 ppm.

(3) Synthesis of Polymerization Initiator (IIa)

In a glove box under nitrogen atmosphere, 15.98 g of potassium hydride in mineral oil form (Kanto Chemical Co., Ltd.) was weighed and fed into a 500-mL four neck flask equipped with a thermometer, dropping funnel, and Dimroth condenser, under nitrogen stream. Hexane washing to separate off the mineral oil was followed by vacuum drying for about 2 hours, obtaining 6.193 g (154 mmol) of potassium hydride. To the flask, 127.65 g of distilled THF was added via a syringe. A dropping funnel was filled with 18.737 g (156 mmol) of distilled diethylene glycol monomethyl ether, which was added dropwise in small portions to the flask. Subsequent aging for 2 hours gave 148.62 g of a THF solution of Polymerization Initiator (IIa) (1.05 mmol/g). At this point, neither salt precipitation nor cloudiness was observed. The molar ratio of Polymerization Initiator (IIa) synthesized by the reaction to the alcohol as initiator-forming material was 99:1.

(4) Synthesis of Polymerization Initiator (IIa) Via Alternative Route

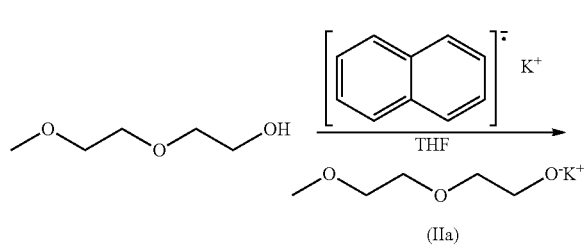

In a glove box, 128.8 g of naphthalene was weighed, fed into a 200-mL two neck flask, and vacuum dried for 2 hours. Thereafter, 128.3 g of dried naphthalene was transferred to a 1-L four neck flask and dissolved in 643.5 g of distilled THF, after which 37.3 g of potassium was added. In a glove box, the contents were stirred for 7 hours, obtaining a THF solution of potassium naphthalenide (1.18 mmol/g). Thereafter, 802.5 g of the THF solution of potassium naphthalenide was transferred to a 1-L four neck flask. In a glove box, a dropping funnel was filled with 119.0 g of the distilled diethylene glycol monomethyl ether, which was added dropwise to the flask under ice cooling. Thereafter, THF and naphthalene were distilled off in vacuum. The residue, 196.8 g, was dissolved in the distilled THF, obtaining 965.1 g of a THF solution of Polymerization Initiator (IIa) (0.98 mmol/g). At this point, neither salt precipitation nor cloudiness was observed.

Example 2

Synthesis of Polymerization Initiator (IIb)
(1) Synthesis of Intermediate (Ib)

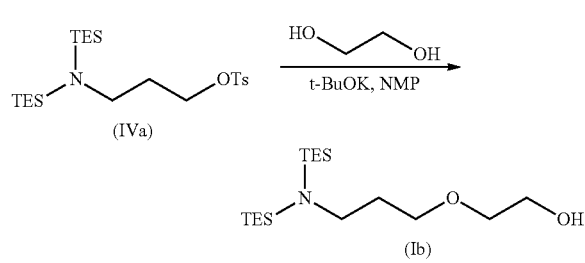

A 100-mL three neck flask was charged with 6.78 g of ethylene glycol, 10 g of N-methylpyrrolidone (NMP), and 1.35 g of potassium tert-butoxide (t-BuOK), which were stirred for 30 minutes. At room temperature, a solution of 5.0 g of Electrophile (IVa) in 15 g of NMP was added dropwise to the flask. The solution was heated at 60° C., stirred for 5 hours, and thereafter, quenched with 0.18 g of sodium hydrogencarbonate. Then the solvent was replaced by diphenyl ether, and the precipitated salt was filtered off. Subsequent distillation in vacuum gave 3.16 g (yield 65.7%) of Intermediate (Ib). The water content after distillation was measured to be up to 1 ppm.

Intermediate (Ib)
colorless liquid
b.p. 118-122° C./10 Pa
$^1$H-NMR (500 MHz, CDCl$_3$): δ=0.60 (12H, q), 0.93 (18H, t), 1.68 (2H, m), 1.96 (1H, bs), 2.82 (2H, m), 3.40 (2H, t), 3.50 (2H, m), 3.73 (2H, m)

(2) Synthesis of Polymerization Initiator (IIb)

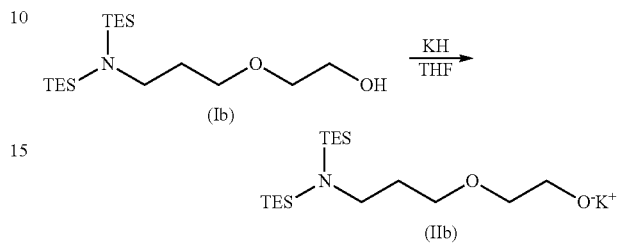

In a glove box under nitrogen atmosphere, potassium hydride in mineral oil form (Kanto Chemical Co., Ltd.) was fed into a 50-mL three neck flask. Hexane washing to separate off the mineral oil was followed by vacuum drying for about 2 hours, obtaining 0.50 g (12.5 mmol) of potassium hydride. To the flask, 7.71 g of distilled THF was added via a syringe, and 4.44 g (12.8 mmol) of Intermediate (Ib) was added dropwise at room temperature. The solution was stirred at room temperature for 1 hour and at 50° C. for 2 hours, obtaining 12.40 g of a THF solution of the compound having formula (IIb) (1.02 mmol/g). At this point, neither salt precipitation nor cloudiness was observed. The molar ratio of Polymerization Initiator (IIb) synthesized by the reaction to the alcohol (Ib) as initiator-forming material was 98:2.

(3) Synthesis of Polymerization Initiator (IIb) Via Alternative Route

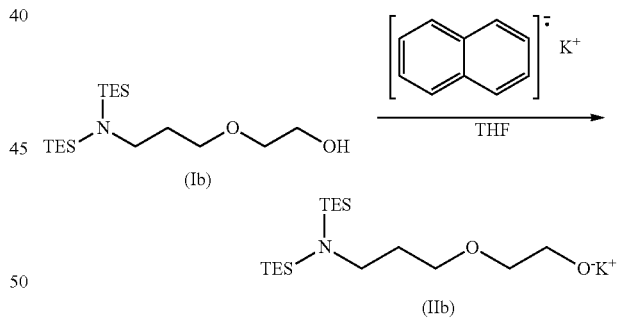

In a glove box under nitrogen atmosphere, 2.02 g of naphthalene and 0.68 g of potassium were weighed and fed into a 100-mL three neck flask, where the contents were vacuum dried for 1 hour. To the flask which resumed nitrogen atmosphere, 19.65 g of distilled THF was added via a syringe. The contents were stirred for 1 hour, obtaining a THF solution of potassium naphthalenide (0.71 mmol/g). Under nitrogen atmosphere, 1.96 g (5.64 mmol) of Intermediate (Ib) was added to a 50-mL three neck flask via a syringe. At room temperature, 7.85 g of the THF solution of potassium naphthalenide was added dropwise to this flask. The solution was aged for 1 hour, obtaining 9.77 g of a THF solution of Polymerization Initiator (IIb) (0.58 mmol/g). At this point, neither salt precipitation nor cloudiness was observed. The molar ratio of Polymerization Initiator (IIb) synthesized by the reaction to the alcohol (Ib) as initiator-forming material was 98:2.

3) Synthesis of Polymer

Example 3

Synthesis of Polymer (Va)

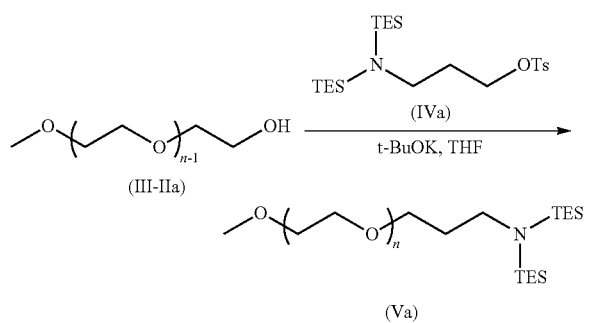

In a dry 200-mL three neck flask, 10 g of methoxypoly-ethylene glycol (Aldrich) was dissolved in 40 g of THF. Under nitrogen stream, 0.793 g of Electrophile (IVa) and 0.173 mL of a THF solution of t-BuOK (1 mol/L) were added to the solution, which was aged at 40° C. for 5 hours. At the end of reaction, the reaction solution at 40° C. was filtered to remove the precipitated salt. A 300-mL beaker equipped with a stirrer was charged with 150 g of hexane, to which the filtrate was added dropwise and aged for 10 minutes. The resulting white powder was collected by filtration, fed back to the beaker, and washed with 100 g of hexane for 10 minutes. The same washing procedure was repeated one more time. The white powder was dried in vacuum, obtaining 7.12 g of Polymer (Va).

On $^1$H-NMR analysis, the polymer was found to contain a reaction by-product, potassium p-toluenesulfonate in an equimolar or more amount relative to the polymer. Also the polymer contained at least 2,000 ppm of potassium ions, as measured by a compact potassium ion meter (Horiba, Ltd.).

Example 4

Synthesis of Polymer (Va) Via Alternative Route (1) Synthesis of Polymer (III-Ia)

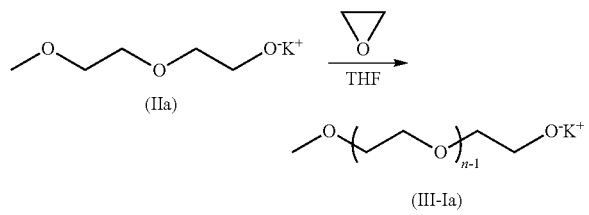

A stirrer was placed in a 2-L four neck flask equipped with a thermometer, dropping funnel, and Dimroth condenser. While the setup was kept in a vacuum of 10 Pa or lower, it was internally heated by means of an oil bath and a heat gun to remove water in the setup. Subsequently, 4.59 g of the THF solution of the polymerization initiator (IIa) (0.98 mmol/g) and 420 g of distilled THF were added to the 2-L four neck flask under nitrogen stream.

A dropping funnel was filled with 63 g of ethylene oxide and 120 g of distilled THF, which were added dropwise in small portioned to the 2-L four neck flask. After it was confirmed that the internal temperature of the flask became steady, the flask was immersed in an oil bath at a temperature of 45° C., whereupon the solution was aged for 6 hours. At the end of reaction, the oil bath was removed. The reaction system was cooled to room temperature, obtaining a solution containing Polymer (III-Ia).

(2) Synthesis of Polymer (Va)

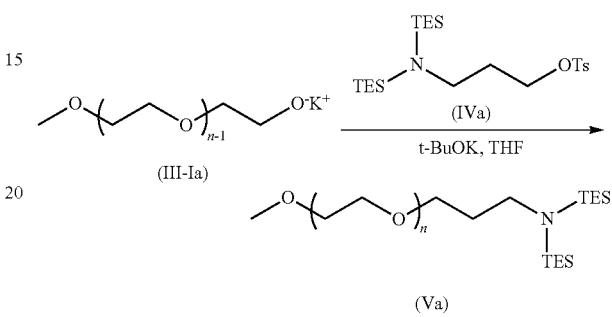

To the solution of Polymer (III-Ia), 6.2 g of Electrophile (IVa) and 9 mL of the THF solution of t-BuOK (1 mol/L) were added. The solution was aged at 40° C. for 5 hours. At the end of reaction, the reaction solution at 40° C. was filtered to remove the precipitated salt. A 2,000-mL beaker containing a stirrer was charged with 1,260 g of hexane, to which the filtrate was added dropwise over 5 minutes from a dropping funnel. The solution was aged for 10 minutes. The resulting white powder was collected by filtration, fed back to the beaker, and washed with 440 g of hexane for 10 minutes. The same washing procedure was repeated one more time. The white powder was dried in vacuum, obtaining 57.2 g of Polymer (Va). The polymer was analyzed by GPC, finding Mw=12,200 and Mw/Mn=1.03.

On $^1$H-NMR analysis, the polymer was found to contain a reaction by-product, potassium p-toluenesulfonate in an equimolar or more amount relative to the polymer. Also the polymer contained at least 2,000 ppm of potassium ions, as measured by a compact potassium ion meter (Horiba, Ltd.).

Example 5

Synthesis of Polymer (Vb) using Initiator (IIb)

(1) Synthesis of Polymer (III-Ib)

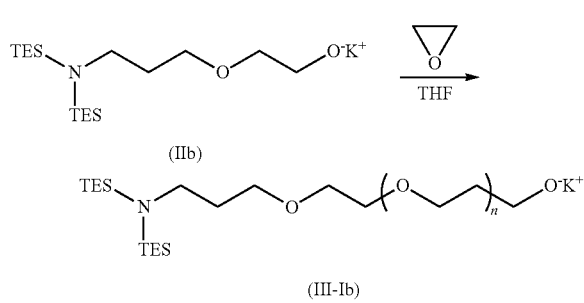

A stirrer was placed in a 500-mL four neck flask equipped with a thermometer, dropping funnel, and Dimroth condenser. While the setup was kept in a vacuum of 10 Pa or lower, it was internally heated by means of an oil bath and a heat gun to remove water in the setup. Subsequently, 1.69 g of the THF solution of Polymerization Initiator (IIb) (1.02 mmol/g) and 140 g of distilled THF were added to the 500-mL four neck flask under nitrogen stream. A dropping funnel was filled with 20 g of ethylene oxide and 40 g of distilled THF, which were added dropwise in divided portions to the 500-mL four neck flask. After it was confirmed that the internal temperature of the flask became steady, the flask was immersed in an oil bath at 45-50° C., whereupon the solution was aged for 8 hours. At the end of reaction, the oil bath was removed. The reaction system was cooled to room temperature, obtaining a solution containing Polymer (III-Ib). An aliquot was sampled out of the solution, quenched with acetic acid, and analyzed by GPC, finding Mw=8,000 and Mw/Mn=1.04.

(2) Synthesis of Polymer (Vb)

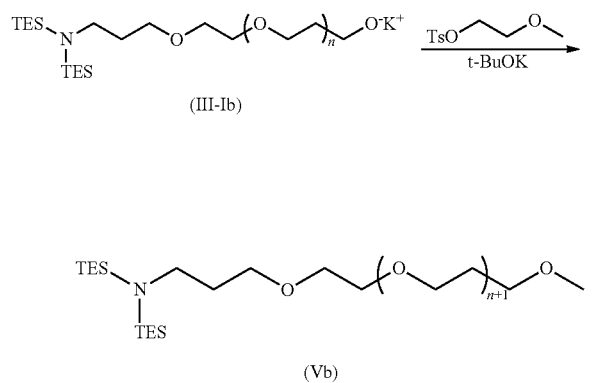

(III-Ib)

(Vb)

To the solution of Polymer (III-Ib), 2.05 g of 2-methoxyethyl p-toluenesulfonate and 0.50 g of t-BuOK were added. The solution was stirred at 40° C. for 5 hours. The reaction solution was filtered to remove the salt and then concentrated to 25 wt %. The concentrate was transferred to a dropping funnel. A 500-mL beaker containing a stirrer was charged with 200 g of hexane, to which the concentrate was added dropwise over 10 minutes from the dropping funnel. The solution was aged for 10 minutes. The resulting white powder was collected by filtration, fed back to the beaker, and washed with 100 g of hexane for 10 minutes. The same washing procedure was repeated one more time. The white powder was dried in vacuum, obtaining 18.6 g of Polymer (Vb). The polymer was analyzed by GPC, finding Mw=8,000 and Mw/Mn=1.05.

On $^1$H-NMR analysis, the polymer was found to contain a reaction by-product, potassium p-toluenesulfonate in an equimolar or more amount relative to the polymer. Also the polymer contained at least 2,000 ppm of potassium ions, as measured by a compact potassium ion meter (Horiba, Ltd.).

4) Deprotection and Purification of Polymer by Ion Exchange Resin Treatment

Example 6

Preparation of Polyalkylene Glycol Derivative (Va-2)

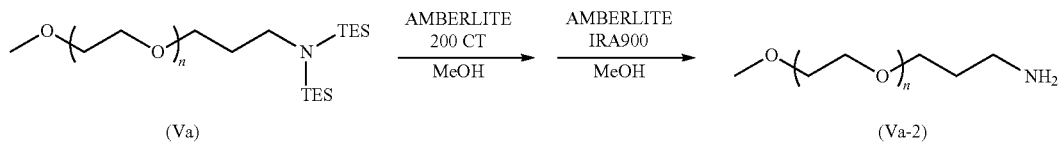

A column was packed with 20 g of cation exchange resin Amberlite 200CT (Dow Chemical), which was washed with 200 g of methanol. In a 100-mL two neck recovery flask, 10 g of Polymer (Va) was dissolved in 40 g of methanol. Using a pump, the polymer solution was delivered into the column. The polymer solution flowing out of the column was fed back to the recovery flask. In this way, the polymer solution was circulated for 3 hours. Thereafter, the polymer solution was withdrawn to the recovery flask, and the resin in the column was washed with 20 g of methanol to recover the polymer.

Next, a column was packed with 40 g of anion exchange resin Amberlite IRA900 (Dow Chemical), which was washed with 400 g of methanol. Using a pump, the polymer solution was delivered into the column. The polymer solution flowing out of the column was fed back to the recovery flask. In this way, the polymer solution was circulated for 3 hours. Thereafter, the polymer solution was withdrawn to the recovery flask, and the resin in the column was washed with 40 g of methanol to recover the polymer. The reaction solution was concentrated by evaporating off methanol, dissolved in 67 g of toluene, which was added dropwise to 150 g of hexane in a 300-mL beaker. The resulting white powder was collected by filtration, fed back to the beaker, and washed with 75 g of hexane for 10 minutes. The same washing procedure was repeated one more time.

The white powder was dried in vacuum, obtaining 7.4 g of polyalkylene glycol derivative (Va-2). The polymer was analyzed by GPC, finding Mw=12,500 and Mw/Mn=1.03. The polymer had a potassium ion content of 0 ppm, as measured by a compact potassium ion meter. This indicates that the by-product and basic compound had been removed.

Example 7

Preparation of Polyalkylene Glycol Derivative (Va-2) Via Alternative Route

A 200-mL three neck flask was charged with 8.0 g of Polymer (Va), 32 g of methanol and 0.2 g of acetic acid, which were stirred at 35° C. for 3 hours. A column was packed with 4.0 g of cation exchange resin Amberlite 200CT and 8.0 g of anion exchange resin Amberlite IRA900, which were washed with 170 g of methanol. Using a pump, the reaction solution was delivered into the column. The polymer solution flowing out of the column was fed back to the flask. In this way, the polymer solution was circulated for 3 hours. Thereafter, the polymer solution was withdrawn to the flask, and the resin in the column was washed with 25 g of methanol. The reaction solution was concentrated by evaporating off methanol, dissolved in 54 g of toluene, which was added dropwise to 120 g of hexane in a 300-mL beaker. The resulting white powder was collected by filtration, fed back to the beaker, and washed with 60 g of hexane for 10 minutes. The same washing procedure was repeated one more time.

The white powder was dried in vacuum, obtaining 7.2 g of polyalkylene glycol derivative (Va-2). The polymer was analyzed by GPC, finding Mw=12,500 and Mw/Mn=1.03. The polymer had a potassium ion content of 0 ppm, as measured by a compact potassium ion meter. This indicates that the by-product and basic compound had been removed. On $^1$H-NMR analysis, no residual acetic acid was observed.

5) Deprotection and Purification of Polymer by Ion Exchange Resin Treatment

Comparative Example 1

Synthesis of Polymer (Va-2) by Adsorption Treatment

A 100-mL three neck flask was charged with 2.5 g of Polymer (Va), 10 g of methanol, and 64 mg of acetic acid, which were stirred at 35° C. for 3 hours. Then 113 mg of potassium methoxide was added to the solution, which was stirred for 1.5 hours. The reaction solution was concentrated by evaporating off methanol, and dissolved in 23 g of toluene. To the solution was added adsorbent KW2000 (Kyowa Chemical Industry Co., Ltd.). The mixture was stirred for 2 hours, after which the adsorbent was removed by filtration. The filtrate was crystallized from 38 g of hexane. The resulting white powder was collected by filtration, fed back to the beaker, and washed with 19 g of hexane for 10 minutes. The same washing procedure was repeated one more time.

The white powder was dried in vacuum, obtaining 1.8 g of Polymer (Va-2). The polymer was analyzed by GPC, finding Mw=12,400 and Mw/Mn=1.03. The polymer had a potassium ion content of 63 ppm, as measured by a compact potassium ion meter.

As seen from the potassium ion contents measured, the removal of water-soluble impurities is incomplete in Comparative Example 1, whereas Examples 6 and 7 demonstrate complete removal of water-soluble impurities.

Japanese Patent Application No. 2017-142468 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a polyalkylene glycol derivative, comprising the steps (3) and (4):

step (3) of reacting a compound having the formula (III-I) with an electrophile having the formula (IV) optionally in the presence of a basic compound, to synthesize a reaction product solution, wherein the reaction product solution comprises a polyalkylene glycol derivative having the formula (V), and step (4) of removing water-soluble impurities by passing the reaction product solution from step (3) through a column packed with a cation exchange resin and through a column packed with an anion exchange resin, or a common column packed with a mixture of cation and anion exchange resins in a circulating manner wherein the reaction product solution circulates at least two passes, thereby purifying the desired polyalkylene glycol derivative,

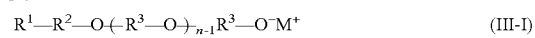   (III-I)

   (IV)

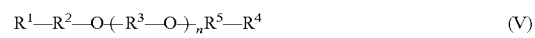   (V)

wherein $R^1$ and $R^4$ are each independently hydrogen, a $C_1$-$C_{20}$ monovalent hydrocarbon group, an azido group, a cyano group, an amino group having a protecting group of the formula (IV-I), a hydroxyl group having a protecting group of the formula (IV-II), or an acetal group of the formula (IV-III), $R^2$ is a $C_1$-$C_6$ divalent hydrocarbon group, oxyalkylene group or polyoxyalkylene group, $R^3$ is a $C_2$-$C_8$ divalent hydrocarbon group, n is an integer of 1 to 450, $R^5$ is a $C_1$-$C_6$ divalent hydrocarbon group, M is an alkali metal, X is a leaving group,

   (IV-I)

   (IV-II)

   (IV-III)

wherein $R^{a1}$ and $R^{a2}$ are each independently hydrogen or an amino protecting group, at least one of $R^{a1}$ and $R^{a2}$ being an amino protecting group, $R^{a1}$ and $R^{a2}$ may bond together to form a ring with the nitrogen atom to which they are attached, $R^b$ is a hydroxyl protecting group, $R^{c1}$ and $R^{c2}$ are each independently a $C_1$-$C_6$ monovalent hydrocarbon group which may contain an oxygen atom, $R^{c1}$ and $R^{c2}$ may bond together to form a cyclic acetal group, and the broken line designates a valence bond.

2. The method of claim 1 wherein $R^1$ and/or $R^4$ is an amino group having a protecting group of the formula (IV-I), a hydroxy group having a protecting group of the formula (IV-II), or an acetal group of the formula (IV-III), the protecting group being deprotected under acidic conditions.

3. The method of claim 2 wherein $R^1$ and/or $R^4$ is a group having the formula (IV-I).

4. The method of claim 3 wherein the group having the formula (IV-I) is a group having the formula (IV-I-I):

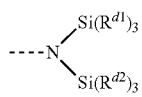  (IV-I-I)

wherein $R^{d1}$ and $R^{d2}$ are each independently a $C_1$-$C_6$ straight, branched or cyclic monovalent hydrocarbon group, and $R^{d1}$ and $R^{d2}$ may bond together to form a ring with the silicon atoms to which they are attached and the nitrogen atom therebetween.

5. The method of claim 1, further comprising, between steps (3) and (4), the step of reacting the polyalkylene glycol derivative having a protecting group with an acid in water or an alcohol solvent for deprotection.

6. The method of claim 1 wherein in step (4), the cation exchange resin and the anion exchange resin are used to deprotect the polyalkylene glycol derivative having formula (V) and simultaneously remove water-soluble impurities, thereby purifying the desired polyalkylene glycol derivative.

7. The method of claim 1 wherein the cation exchange resin is a styrenic H type strong acid cation exchange resin, and the anion exchange resin is a styrenic OH type strong base anion exchange resin.

8. The method of claim 1 wherein the cation exchange resin is a styrenic H type strong acid cation exchange resin of gellular type or porous type having a degree of cross-linking of at least 10.

9. A method for preparing a polyalkylene glycol derivative, comprising the steps (3') and (4):

step (3') of reacting a compound having the formula (III-II) with an electrophile having the formula (IV) in the presence of a basic compound, to synthesize a reaction product solution, wherein the reaction product solution comprises a polyalkylene glycol derivative having the formula (V), and step (4) of removing water-soluble impurities by passing the reaction product solution from step (3') through a column packed with a cation exchange resin and through a column packed with an anion exchange resin, or a common column packed with a mixture of cation and anion exchange resins in a circulating manner wherein the reaction product solution circulates at least two passes, thereby purifying the desired polyalkylene glycol derivative, $R^1$—$R^2$—O—($R^3$—O—)$_{n-1}R^3$—OH (III-I)

$R^4$—$R^5$—X (IV)

$R^1$—$R^2$—O—($R^3$—O—)$_n R^5$—$R^4$ (V)

wherein $R^1$ and $R^4$ are each independently hydrogen, a $C_1$-$C_{20}$ monovalent hydrocarbon group, an azido group, a cyano group, an amino group having a protecting group of the formula (IV-I), a hydroxyl group having a protecting group of the formula (IV-II), or an acetal group of the formula (IV-III), $R^2$ is a $C_1$-$C_6$ divalent hydrocarbon group, oxyalkylene group or polyoxyalkylene group, $R^3$ is a $C_2$-$C_8$ divalent hydrocarbon group, n is an integer of 1 to 450, $R^5$ is a $C_1$-$C_6$ divalent hydrocarbon group, X is a leaving group,

wherein $R^{a1}$ and $R^{a2}$ are each independently hydrogen or an amino protecting group, at least one of $R^{a1}$ and $R^{a2}$ being an amino protecting group, $R^{a1}$ and $R^{a2}$ may bond together to form a ring with the nitrogen atom to which they are attached, $R^b$ is a hydroxyl protecting group, $R^{c1}$ and $R^{c2}$ are each independently a $C_1$-$C_6$ monovalent hydrocarbon group which may contain an oxygen atom, $R^{c1}$ and $R^{c2}$ may bond together to form a cyclic acetal group, and the broken line designates a valence bond.

10. A method for preparing a polyalkylene glycol derivative, comprising the steps (1), (2-1), (3) and (4):

step (1) of reacting a compound having the formula (I) with an alkali metal or alkali metal compound selected from M, $M^+H^-$, $R_X^-M^+$, $[R_Y]^{!-}M^+$ and $R_ZO^-M^+$ wherein M is an alkali metal, $R_X$ is a $C_1$-$C_{20}$ alkyl group or $C_7$-$C_{20}$ aralkyl group, $R_Y$ is an optionally substituted aromatic compound, $R_Z$ is a $C_1$-$C_6$ alkyl group, to synthesize a compound having the formula (II), step (2-1) of reacting the compound having the formula (II) with an alkylene oxide in a polymerization solvent to synthesize a compound having the formula (III-I), step (3) of reacting the compound having the formula (III-I) with an electrophile having the formula (IV) optionally in the presence of a basic compound, to synthesize a reaction product solution, wherein the reaction product solution comprises a polyalkylene glycol derivative having the formula (V), and step (4) of removing water-soluble impurities by passing the reaction product solution from step (3) through a column packed with a cation exchange resin and through a column packed with an anion exchange resin, or a common column packed with a mixture of cation and anion exchange resins in a circulating manner wherein the reaction product solution circulates at least two passes, thereby purifying the desired polyalkylene glycol derivative, $$R^1-R^2-OH \qquad (I)$$

$$R^1-R^2-O^-M^+ \qquad (II)$$

$$R^1-R^2-O+R^3-O)_{n-1}R^3-O^-M^+ \qquad (III\text{-}I)$$

$$R^4-R^5-X \qquad (IV)$$

$$R^1-R^2-O+R^3-O)_{n}R^5-R^4 \qquad (V)$$

wherein $R^1$ and $R^4$ are each independently hydrogen, a $C_1$-$C_{20}$ monovalent hydrocarbon group, an azido group, a cyano group, an amino group having a protecting group of the formula (IV-I), a hydroxyl group having a protecting group of the formula (IV-II), or an acetal group of the formula (IV-III), $R^2$ is a $C_1$-$C_6$ divalent hydrocarbon group, oxyalkylene group or polyoxyalkylene group, $R^3$ is a $C_2$-$C_8$ divalent hydrocarbon group, n is an integer of 1 to 450, $R^5$ is a $C_1$-$C_6$ divalent hydrocarbon group, M is an alkali metal, X is a leaving group,

wherein $R^{a1}$ and $R^{a2}$ are each independently hydrogen or an amino protecting group, at least one of $R^{a1}$ and $R^{a2}$ being an amino protecting group, $R^{a1}$ and $R^{a2}$ may bond together to form a ring with the nitrogen atom to which they are attached, $R^b$ is a hydroxyl protecting group, $R^{c1}$ and $R^{c2}$ are each independently a $C_1$-$C_6$ monovalent hydrocarbon group which may contain an oxygen atom, $R^{c1}$ and $R^{c2}$ may bond together to form a cyclic acetal group, and the broken line designates a valence bond.

11. A method for preparing a polyalkylene glycol derivative, comprising the steps (1), (2-1), (2-2), (3') and (4):
step (1) of reacting a compound having the formula (I) with an alkali metal or alkali metal compound selected from M, $M^+H^-$, $R_X^-M^+$, $[R_Y]^{·-}M^+$ and $R_ZO^-M^+$ wherein M is an alkali metal, $R_X$ is a $C_1$-$C_{20}$ alkyl group or $C_7$-$C_{20}$ aralkyl group, $R_Y$ is an optionally substituted aromatic compound, $R_Z$ is a $C_1$-$C_6$ alkyl group, to synthesize a compound having the formula (II),
step (2-1) of reacting the compound having the formula (II) with an alkylene oxide in a polymerization solvent to synthesize a compound having the formula (III-I),
step (2-2) of reacting the compound having the formula (III-I) with an acidic compound to form a compound having the formula (III-II),
step (3') of reacting the compound having the formula (III-II) with an electrophile having the formula (IV) in the presence of a basic compound, to synthesize a reaction product solution, wherein the reaction product solution comprises a polyalkylene glycol derivative having the formula (V), and
step (4) of removing water-soluble impurities by passing the reaction product solution from step (3') through a column packed with a cation exchange resin and through a column packed with an anion exchange resin, or a common column packed with a mixture of cation and anion exchange resins in a circulating manner wherein the reaction product solution circulates at least two passes, thereby purifying the desired polyalkylene glycol derivative, $$R^1-R^2-OH \qquad (I)$$

$$R^1-R^2-O^-M^+ \qquad (II)$$

$$R^1-R^2-O+R^3-O)_{n-1}R^3-O^-M^+ \qquad (III\text{-}I)$$

$$R^1-R^2-O+R^3-O)_{n-1}R^3-OH \qquad (III\text{-}II)$$

$$R^4-R^5-X \qquad (IV)$$

$$R^1-R^2-O+R^3-O)_{n}R^5-R^4 \qquad (V)$$

wherein $R^1$ and $R^4$ are each independently hydrogen, a $C_1$-$C_{20}$ monovalent hydrocarbon group, an azido group, a cyano group, an amino group having a protecting group of the formula (IV-I), a hydroxyl group having a protecting group of the formula (IV-II), or an acetal group of the formula (IV-III), $R^2$ is a $C_1$-$C_6$ divalent hydrocarbon group, oxyalkylene group or polyoxyalkylene group, $R^3$ is a $C_2$-$C_8$ divalent hydrocarbon group, n is an integer of 1 to 450, $R^5$ is a $C_1$-$C_6$ divalent hydrocarbon group, M is an alkali metal, X is a leaving group,

wherein $R^{a1}$ and $R^{a2}$ are each independently hydrogen or an amino protecting group, at least one of $R^{a1}$ and $R^{a2}$ being an amino protecting group, $R^{a1}$ and $R^{a2}$ may bond together to form a ring with the nitrogen atom to which they are attached, $R^b$ is a hydroxyl protecting group, $R^{c1}$ and $R^{c2}$ are each independently a $C_1$-$C_6$ monovalent hydrocarbon group which may contain an oxygen atom, $R^{c1}$ and $R^{c2}$ may bond together to form a cyclic acetal group, and the broken line designates a valence bond.

12. A method for purifying a mixture containing a polyalkylene glycol derivative and water-soluble impurities, comprising the step of passing the mixture through a column packed with a cation exchange resin and through a column packed with an anion exchange resin or a common column packed with a mixture of cation and anion exchange resins in a circulating manner wherein the mixture circulates at least two passes to adsorb the water-soluble impurities, thereby removing the water-soluble impurities and purifying the polyalkylene glycol derivative.

13. The method of claim 12 wherein the polyalkylene glycol derivative is a polyalkylene glycol derivative terminated with an amino group.

14. A method for preparing a polyalkylene glycol derivative, comprising step (3), a deprotection step, and step (4):

step (3) of reacting a compound having the formula (III-I) with an electrophile having the formula (IV) optionally in the presence of a basic compound, to synthesize a reaction product solution, wherein the reaction product solution comprises a polyalkylene glycol derivative having the formula (V), wherein the polyalkylene glycol derivative has a protecting group;

a deprotection step of reacting the polyalkylene glycol derivative having the protecting group with an acid in water or an alcohol solvent to provide a deprotected polyalkylene glycol derivative, wherein the deprotected polyalkylene glycol is subjected, without post-treatment, to step (4), and step (4) of removing water-soluble impurities from the deprotected polyalkylene glycol by passing the deprotected polyalkylene glycol from the deprotection step through a column packed with a cation exchange resin and an anion exchange resin, or a common column packed with a mixture of cation and anion exchange resins, in a circulating manner wherein the reaction product solution circulates at least two passes, thereby purifying the polyalkylene glycol derivative,

  (III-I)

  (IV)

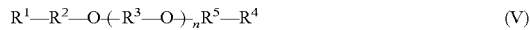  (V)

wherein $R^1$ and $R^4$ are each independently hydrogen, a $C_1$-$C_{20}$ monovalent hydrocarbon group, an azido group, a cyano group, an amino group having a protecting group of the formula (IV-I), a hydroxyl group having a protecting group of the formula (IV-II), or an acetal group of the formula (IV-III), $R^2$ is a $C_1$-$C_6$ divalent hydrocarbon group, oxyalkylene group or polyoxyalkylene group, $R^3$ is a $C_2$-$C_8$ divalent hydrocarbon group, n is an integer of 1 to 450, $R^5$ is a $C_1$-$C_6$ divalent hydrocarbon group, M is an alkali metal, X is a leaving group,

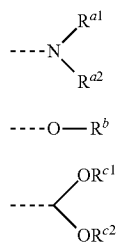

wherein $R^{a1}$ and $R^{a2}$ are each independently hydrogen or an amino protecting group, at least one of $R^{a1}$ and $R^{a2}$ being an amino protecting group, $R^{a1}$ and $R^{a2}$ may bond together to form a ring with the nitrogen atom to which they are attached, $R^b$ is a hydroxyl protecting group, $R^{c1}$ and $R^{c2}$ are each independently a $C_1$-$C_6$ monovalent hydrocarbon group which may contain an oxygen atom, $R^{c1}$ and $R^{c2}$ may bond together to form a cyclic acetal group, and the broken line designates a valence bond.

15. A method for preparing a polyalkylene glycol derivative, comprising the step (3'), a deprotection step, and step (4):

step (3') of reacting a compound having the formula (III-II) with an electrophile having the formula (IV) in the presence of a basic compound, to synthesize a reaction product solution, wherein the reaction product solution comprises a polyalkylene glycol derivative having the formula (V), wherein the polyalkylene glycol derivative has a protecting group;

a deprotection step of reacting the polyalkylene glycol derivative having the protecting group with an acid in water or an alcohol solvent to provide a deprotected polyalkylene glycol derivative, wherein the deprotected polyalkylene glycol is subjected, without post-treatment, to step (4), and step (4) of removing water-soluble impurities from the deprotected polyalkylene glycol by passing the deprotected polyalkylene glycol from the deprotection step through a column packed with a cation exchange resin and an anion exchange resin, or a common column packed with a mixture of cation and anion exchange resins, in a circulating manner wherein the reaction product solution circulates at least two passes, thereby purifying the polyalkylene glycol derivative,

  (III-II)

  (IV)

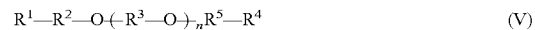  (V)

wherein $R^1$ and $R^4$ are each independently hydrogen, a $C_1$-$C_{20}$ monovalent hydrocarbon group, an azido group, a cyano group, an amino group having a protecting group of the formula (IV-I), a hydroxyl group having a protecting group of the formula (IV-II), or an acetal group of the formula (IV-III), $R^2$ is a $C_1$-$C_6$ divalent hydrocarbon group, oxyalkylene group or polyoxyalkylene group, $R^3$ is a $C_2$-$C_8$ divalent hydrocarbon group, n is an integer of 1 to 450, $R^5$ is a $C_1$-$C_6$ divalent hydrocarbon group, X is a leaving group,

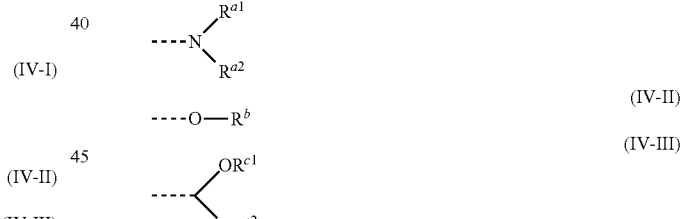

wherein $R^{a1}$ and $R^{a2}$ are each independently hydrogen or an amino protecting group, at least one of $R^{a1}$ and $R^{a2}$ being an amino protecting group, $R^{a1}$ and $R^{a2}$ may bond together to form a ring with the nitrogen atom to which they are attached, $R^b$ is a hydroxyl protecting group, $R^{c1}$ and $R^{c2}$ are each independently a $C_1$-$C_6$ monovalent hydrocarbon group which may contain an oxygen atom, $R^{c1}$ and $R^{c2}$ may bond together to form a cyclic acetal group, and the broken line designates a valence bond.

16. A method for preparing a polyalkylene glycol derivative, comprising the steps (1), (2-1), (3), a deprotection step, and step (4):

step (1) of reacting a compound having the formula (I) with an alkali metal or alkali metal compound selected from M, $M^+H^-$, $R_X^-M^+$, $[R_Y]^{I-}M^+$ and $R_ZO^-M^+$ wherein M is an alkali metal, $R_X$ is a $C_1$-$C_{20}$ alkyl group or $C_7$-$C_{20}$ aralkyl group, $R_Y$ is an optionally substituted aromatic compound, $R_Z$ is a $C_1$-$C_6$ alkyl group, to synthesize a compound having the formula (II), step (2-1) of reacting the compound having the formula (II) with an alkylene oxide in a polymerization solvent to synthesize a compound having the formula (III-I), step (3) of reacting the compound having the formula (III-I) with an electrophile having the formula (IV) optionally in the presence of a basic compound, to synthesize a reaction product solution, wherein the reaction product solution comprises a polyalkylene glycol derivative having the formula (V), wherein the polyalkylene glycol derivative has a protecting group;

a deprotection step of reacting the polyalkylene glycol derivative having the protecting group with an acid in water or an alcohol solvent to provide a deprotected polyalkylene glycol derivative, wherein the deprotected polyalkylene glycol is subjected, without post-treatment, to step (4), and step (4) of removing water-soluble impurities from the deprotected polyalkylene glycol by passing the deprotected polyalkylene glycol from the deprotection step through a column packed with a cation exchange resin and an anion exchange resin, or a common column packed with a mixture of cation and anion exchange resins, in a circulating manner wherein the reaction product solution circulates at least two passes, thereby purifying the polyalkylene glycol derivative, $$R^1\text{—}R^2\text{—}OH \tag{I}$$

$$R^1\text{—}R^2\text{—}O^-M^+ \tag{II}$$

$$R^1\text{—}R^2\text{—}O\text{—}(R^3\text{—}O)_{n-1}R^3\text{—}O^-M^+ \tag{III-I}$$

$$R^4\text{—}R^5\text{—}X \tag{IV}$$

$$R^1\text{—}R^2\text{—}O\text{—}(R^3\text{—}O)_n R^5\text{—}R^4 \tag{V}$$

wherein $R^1$ and $R^4$ are each independently hydrogen, a $C_1$-$C_{20}$ monovalent hydrocarbon group, an azido group, a cyano group, an amino group having a protecting group of the formula (IV-I), a hydroxyl group having a protecting group of the formula (IV-II), or an acetal group of the formula (IV-III), $R^2$ is a $C_1$-$C_6$ divalent hydrocarbon group, oxyalkylene group or polyoxyalkylene group, $R^3$ is a $C_2$-$C_8$ divalent hydrocarbon group, n is an integer of 1 to 450, $R^5$ is a $C_1$-$C_6$ divalent hydrocarbon group, M is an alkali metal, X is a leaving group,

$$\text{----}N\begin{matrix}R^{a1}\\R^{a2}\end{matrix} \tag{IV-I}$$

$$\text{----}O\text{—}R^b \tag{IV-II}$$

$$\text{----}\begin{matrix}OR^{c1}\\OR^{c2}\end{matrix} \tag{IV-III}$$

wherein $R^{a1}$ and $R^{a2}$ are each independently hydrogen or an amino protecting group, at least one of $R^{a1}$ and $R^{a2}$ being an amino protecting group, $R^{a1}$ and $R^{a2}$ may bond together to form a ring with the nitrogen atom to which they are attached, $R^b$ is a hydroxyl protecting group, $R^{c1}$ and $R^{c2}$ are each independently a $C_1$-$C_6$ monovalent hydrocarbon group which may contain an oxygen atom, $R^{c1}$ and $R^{c2}$ may bond together to form a cyclic acetal group, and the broken line designates a valence bond.

17. A method for preparing a polyalkylene glycol derivative, comprising the steps (1), (2-1), (2-2), (3'), a deprotection step, and (4):

step (1) of reacting a compound having the formula (I) with an alkali metal or alkali metal compound selected from M, $M^+H^-$, $R_X^-M^+$, $[R_Y]^{\cdot-}M^+$ and $R_ZO^-M^+$ wherein M is an alkali metal, $R_X$ is a $C_1$-$C_{20}$ alkyl group or $C_7$-$C_{20}$ aralkyl group, $R_Y$ is an optionally substituted aromatic compound, $R_Z$ is a $C_1$-$C_6$ alkyl group, to synthesize a compound having the formula (II), step (2-1) of reacting the compound having the formula (II) with an alkylene oxide in a polymerization solvent to synthesize a compound having the formula (III-I), step (2-2) of reacting the compound having the formula (III-I) with an acidic compound to form a compound having the formula (III-II), step (3') of reacting the compound having the formula (III-II) with an electrophile having the formula (IV) in the presence of a basic compound, to synthesize a reaction product solution, wherein the reaction product solution comprises a polyalkylene glycol derivative having the formula (V), wherein the polyalkylene glycol derivative has a protecting group;

a deprotection step of reacting the polyalkylene glycol derivative having a protecting group with an acid in water or an alcohol solvent for deprotection, and post-treatment is not carried out after deprotection step, and step (4) of removing water-soluble impurities from the deprotected polyalkylene glycol by passing the deprotected polyalkylene glycol from the deprotection step through a column packed with a cation exchange resin and an anion exchange resin, or a common column packed with a mixture of cation and anion exchange resins, in a circulating manner wherein the reaction product solution circulates at least two passes, thereby purifying the polyalkylene glycol derivative, $$R^1\text{—}R^2\text{—}OH \tag{I}$$

$$R^1\text{—}R^2\text{—}O^-M^+ \tag{II}$$

$$R^1\text{—}R^2\text{—}O\text{—}(R^3\text{—}O)_{n-1}R^3\text{—}O^-M^+ \tag{III-I}$$

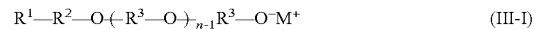

$$R^1\text{—}R^2\text{—}O\text{—}(R^3\text{—}O)_{n-1}R^3\text{—}OH \tag{III-II}$$

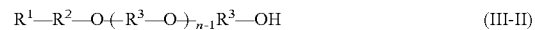

$$R^4\text{—}R^5\text{—}X \tag{IV}$$

$$R^1\text{—}R^2\text{—}O\text{—}(R^3\text{—}O)_n R^5\text{—}R^4 \tag{V}$$

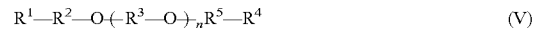

wherein $R^1$ and $R^4$ are each independently hydrogen, a $C_1$-$C_{20}$ monovalent hydrocarbon group, an azido group, a cyano group, an amino group having a protecting group of the formula (IV-I), a hydroxyl group having a protecting group of the formula (IV-II), or an acetal group of the formula (IV-III), $R^2$ is a $C_1$-$C_6$ divalent hydrocarbon group, oxyalkylene group or polyoxyalkylene group, $R^3$ is a $C_2$-$C_8$ divalent hydrocarbon group, n is an integer of 1 to 450, $R^5$ is a $C_1$-$C_6$ divalent hydrocarbon group, M is an alkali metal, X is a leaving group,

(IV-I)

(IV-II)

(IV-III)

wherein $R^{a1}$ and $R^{a2}$ are each independently hydrogen or an amino protecting group, at least one of $R^{a1}$ and $R^{a2}$ being an amino protecting group, $R^{a1}$ and $R^{a2}$ may bond together to form a ring with the nitrogen atom to which they are attached, $R^b$ is a hydroxyl protecting group, $R^{c1}$ and $R^{c2}$ are each independently a $C_1$-$C_6$ monovalent hydrocarbon group which may contain an oxygen atom, $R^{c1}$ and $R^{c2}$ may bond together to form a cyclic acetal group, and the broken line designates a valence bond.

\* \* \* \* \*